US009523862B2

(12) United States Patent
Hattori

(10) Patent No.: US 9,523,862 B2
(45) Date of Patent: Dec. 20, 2016

(54) IMAGE BLUR CORRECTION DEVICE AND IMAGING APPARATUS

(71) Applicant: SONY CORPORATION, Tokyo (JP)

(72) Inventor: Kazuhiro Hattori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/628,475

(22) Filed: Feb. 23, 2015

(65) Prior Publication Data

US 2015/0248017 A1 Sep. 3, 2015

(30) Foreign Application Priority Data

Mar. 3, 2014 (JP) ................................ 2014-040764

(51) Int. Cl.
*G02B 27/64* (2006.01)
*G02B 7/02* (2006.01)

(52) U.S. Cl.
CPC .................................. *G02B 27/646* (2013.01)

(58) Field of Classification Search
CPC ....... G02B 27/646; G02B 7/023; G03B 17/12; G03B 2205/0007; G03B 2205/0023
USPC ........................... 359/554, 557, 822; 396/55
See application file for complete search history.

(56) References Cited

U.S. PATENT DOCUMENTS 5,973,319 A * 10/1999 Washisu .............. G02B 27/646 250/231.13
7,660,053 B2 * 2/2010 Naitou .................. G03B 13/34 359/702
8,605,376 B2 * 12/2013 Saito ...................... G02B 7/102 359/822
9,300,196 B2 * 3/2016 Han ..................... H02K 41/035
2006/0061885 A1 * 3/2006 Ito .......................... G02B 7/023 359/811
2007/0216504 A1 * 9/2007 Gonzalez ............ H02K 49/106 335/200
2010/0182696 A1 * 7/2010 Hasegawa ........... G02B 27/646 359/557
2012/0200176 A1 * 8/2012 Park ...................... G02B 7/102 310/12.16

FOREIGN PATENT DOCUMENTS

JP H07-274056 A 10/1995

* cited by examiner

*Primary Examiner* — Frank Font
(74) *Attorney, Agent, or Firm* — Chip Law Group

(57) ABSTRACT

An image blur correction device includes a driving motor that rotates a driven object in an axial rotation direction of a fulcrum axis. The driving motor includes a stator that has either one of a magnet and a driving coil mounted thereon, a first rotor that is positioned to face the stator and has the other of the magnet and the driving coil mounted thereon so as to rotate in a state where the first rotor is attracted toward the stator by magnetic force, a plurality of rolling members that rotates in accordance with rotation of the first rotor and revolves about an axis of rotation of the first rotor, and a second rotor that holds the plurality of rolling members and rotates with the driven object incorporated therein about the axis of rotation of the first rotor in accordance with revolution of the plurality of rolling members.

12 Claims, 16 Drawing Sheets

1
2
2a
2b
3
4
5
6
7
7
11
12
13
14
19
31

1
2
2a
2b
2c
3
4
5
5
6
7
7
8
8
9
10
10
11
13
13a
14

32, 43
34b, 45b
33, 44
22, 27
38a, 49a
35b, 46b
41, 52
22b, 27b
37a, 48a
40, 51
22a, 27a
37, 48
39, 50
26a, 29a
38, 49
35a, 46a
42, 53
41, 52
38a, 49a
36, 47
35, 46
26, 29
34b, 45b
34, 45
34a, 45a 32, 43
33, 44
34b, 45b
22, 27
59
38a, 49a
54
57
58
55
56
59
40, 51
37a, 48a
37, 48
38, 49
35a, 46a
22a, 27a
39, 50
26a, 29a
42, 53
56
55
54
57
38a, 49a
36, 47
35, 46
34b, 45b
34, 45
34a, 45a
26, 29

IMAGE BLUR CORRECTION DEVICE AND IMAGING APPARATUS

CROSS REFERENCE TO RELATED APPLICATIONS

This application claims the benefit of Japanese Priority Patent Application JP 2014-040764 filed Mar. 3, 2014, the entire contents of which are incorporated herein by reference.

BACKGROUND

The present technology relates to the technical fields of an image blur correction device and an imaging apparatus having the device. The image blur correction device is provided with a driving motor that has a stator and a rotor, rotates the rotor by supplying a driving coil with driving current, and corrects image blur by causing the driving motor to rotate a driven object.

Some imaging apparatuses, such as video cameras and still cameras, are provided with, for example, an image blur correction device that performs image blur correction by moving a lens, which is an optical element, in a direction orthogonal to the optical axis direction.

In some image blur correction devices provided in such imaging apparatuses, for example, a lens unit having a lens is provided as a driven object, and is rotatable in the axial rotation directions of the fulcrum axis orthogonal to the optical axis of the lens relative to an outer casing (for example, refer to Japanese Unexamined Patent Application Publication No. 7-274056).

In the imaging apparatus described in Japanese Unexamined Patent Application Publication No. 7-274056, the lens unit performs image blur correction by rotating in a first direction (yawing direction) and a second direction (pitching direction) relative to the outer casing. The first direction is an axial rotation direction of a first fulcrum axis orthogonal to the optical axis of the lens relative to the outer casing. The second direction is an axial rotation direction of a second fulcrum axis orthogonal to both the optical axis and the first fulcrum axis.

In the imaging apparatus described in Japanese Unexamined Patent Application Publication No. 7-274056, two driving motors (flat motors) each have a plurality of driving coils and a plurality of magnets in order to rotate the lens unit in the yawing direction and the pitching direction. The plurality of driving coils is arranged in the axial rotation direction (circumferential direction) of the fulcrum axis. The magnets are attached, for example, such that N poles and S poles are alternately arranged in the axial rotation direction (circumferential direction) of the fulcrum axis. The axial directions of the output axes of each driving motor respectively coincide with the first fulcrum axis and the second fulcrum axis.

The driving motor rotates the lens unit in the yawing direction and the pitching direction by using thrust force. The thrust force is generated between the driving coils and the magnets when the driving coils and the magnets are disposed to face each other and current is supplied to the driving coils.

One driving motor is disposed, for example, on the upper surface side of the lens unit in the up-down direction of the motor. The driving motor is configured to rotate the lens unit in the yawing direction in accordance with a current supply direction when the current is supplied to the driving coils. The other driving motor is disposed, for example, on the side surface side of the lens unit in the left-right direction of the motor. The driving motor is configured to rotate the lens unit in the pitching direction in accordance with a current supply direction when the current is supplied to the driving coils.

In the lens unit, rotation ranges in the yawing direction and the pitching direction are set, and thus stoppers for setting the rotation ranges in the respective directions are respectively provided on both sides in the rotation directions of the lens unit.

SUMMARY

Meanwhile, in the image blur correction device described in Japanese Unexamined Patent Application Publication No. 7-274056, for example, when photography is intended to be performed in a state where an imaging apparatus is mounted on a tripod, a blur correction function is not necessary. Hence, in order not to rotate the lens unit, the following operation is executed: current is applied to the driving coils, and the lens unit is held at the centers of the rotation ranges in the yawing direction and the pitching direction.

However, even in a state where the blur correction function is not necessary, current is applied to the driving coils, and thus power consumption increases. Further, a servo is activated by applying current to the driving coils, and thus the lens unit infinitesimally vibrates due to occurrence of servo noise. As a result, there is a concern about the occurrence of image blur (peak time) caused by the vibration.

Further, when the imaging apparatus is not used, the application of current to the driving coils is stopped, and a non-current-applied state is attained. However, in this state, the lens unit can be rotated. Hence, for example, the lens unit may be rotated by vibration and the like caused by carrying of the apparatus. As a result, the lens unit may collide with a stopper for setting the rotation ranges. When such collision between the lens unit and the stopper occurs, there is a concern that problems of the occurrence of noise and deterioration in durability of the structure thereof may occur.

According to the image blur correction device and the imaging apparatus of the present technology, it is desirable to prevent the problems from occurring in a state where the blur correction function is not executed.

According to a first embodiment of the present technology, an image blur correction device includes a driving motor that rotates a driven object, which has at least one optical element in order to correct image blur, in an axial rotation direction of a fulcrum axis orthogonal to an optical axis of the optical element. The driving motor includes a stator that has either one of a magnet and a driving coil mounted thereon, a first rotor that is positioned to face the stator and has the other of the magnet and the driving coil mounted thereon so as to rotate in a state where the first rotor is attracted toward the stator by magnetic force, a plurality of rolling members that rotates in accordance with rotation of the first rotor, which is pressed from an opposite side by the stator and the first rotor, and revolves about an axis of rotation of the first rotor, and a second rotor that holds the plurality of rolling members and rotates with the driven object incorporated therein about the axis of rotation of the first rotor in accordance with revolution of the plurality of rolling members.

Thereby, when the current is not applied to the driving coils, the rotation of the first rotor relative to the stator is regulated and the rotation of the driven object is regulated by frictional force between the first rotor and the rolling member and frictional force between the stator and the rolling member.

According to a second embodiment of the present technology, in the image blur correction device, it is preferable that an insertion alignment opening is formed on the central portion of the stator and at least a part of the second rotor is disposed in the insertion alignment opening.

Thereby, the second rotor, of which a part is disposed on the central portion of the stator, is rotated related to the stator.

According to a third embodiment of the present technology, in the image blur correction device, it is preferable that a bearing is disposed in the insertion alignment opening and the second rotor rotate about the stator through the bearing.

Thereby, a bearing is interposed between the stator and the second rotor.

According to a fourth embodiment of the present technology, in the image blur correction device, it is preferable that, as the fulcrum axis, a first fulcrum axis orthogonal to the optical axis of the optical element and a second fulcrum axis orthogonal to both the optical axis and the first fulcrum axis are formed. In addition, it is also preferable that a first driving motor, which rotates the driven object in a first direction as an axial rotation direction of the first fulcrum axis, is provided and a second driving motor, which rotates the driven object in a second direction as an axial rotation direction of the second fulcrum axis, is provided.

Thereby, the lens unit is rotated in the first direction by the first driving motor, and is rotated in the second direction by the second driving motor.

According to a fifth embodiment of the present technology, in the image blur correction device, it is preferable that the axis of rotation of the first rotor coincide with the central axis of rotation of the second rotor.

Thereby, the combined size of the first rotor and the second rotor is reduced.

According to a sixth embodiment of the present technology, in the image blur correction device, it is preferable that a rigid ball is used as the rolling member.

Thereby, in accordance with the rotation of the first rotor, the rigid balls are rotated and revolved.

According to a seventh embodiment of the present technology, in the image blur correction device, it is preferable that a guide groove, which extends in a circumferential direction and into which a part of each rigid ball is inserted, is formed on the stator and the first rotor.

Thereby, the rigid balls are guided by the guide grooves, and are revolved about the axis of rotation of the first rotor, and the rigid balls are not moved in the radial direction of the first rotor and the stator.

According to an eighth embodiment of the present technology, in the image blur correction device, it is preferable that a rotating body is used as the rolling member and the rotating body have a connection shaft portion which extends in a direction orthogonal to the axis of rotation, an inner rolling portion which is formed in a discoid shape and of which a central portion is combined with one end of the connection shaft portion in an axial direction thereof, and an outer rolling portion which is formed in a discoid shape and of which a central portion is combined with the other end of the connection shaft portion in the axial direction. In addition, it is also preferable that, assuming that an outer diameter of the connection shaft portion is R1, an outer diameter of the inner rolling portion is R2, and an outer diameter of the outer rolling portion is R3, R2 and R3 are greater than R1. In addition, it is also preferable that the inner rolling portion is positioned to be closer to the axis of rotation than the outer rolling portion, the connection shaft portion is pressed by either one of the stator and the first rotor, and the inner rolling portion and the outer rolling portion are pressed by the other of the stator and the first rotor.

Thereby, in accordance with the rotation of the first rotor, the rotating bodies are rotated and revolved.

According to a ninth embodiment of the present technology, in the image blur correction device, it is preferable that the connection shaft portion is pressed by the first rotor, and the inner rolling portion and the outer rolling portion are pressed by the stator.

Thereby, the second rotator is rotated at a reduced speed relative to the first rotor.

According to a tenth embodiment of the present technology, in the image blur correction device, it is preferable that the outer diameter of the outer rolling portion is greater than the outer diameter of the inner rolling portion.

Thereby, the inner rolling portion and the outer rolling portion are unlikely to slip over the first rotor and the stator.

According to an eleventh embodiment of the present technology, in the image blur correction device, it is preferable that, assuming that a distance from the central axis of rotation of the second rotor to the inner rolling portion in a direction orthogonal to the central axis of rotation of the second rotor is R4, and a distance from the central axis of rotation of the second rotor to the outer rolling portion in the direction orthogonal to the central axis of rotation of the second rotor is R5, R5/R4=R3/R2.

Thereby, the inner rolling portion and the outer rolling portion do not slip over the first rotor and the stator.

According to the present technology, an imaging apparatus includes an image blur correction device that has a driven object which has at least one optical element, an outer casing which has the driven object disposed therein, and a driving motor which rotates the driven object in an axial rotation direction of a fulcrum axis orthogonal to an optical axis of the optical element, and that corrects image blur by rotating the driven object. The driving motor includes a stator that has either one of a magnet and a driving coil mounted thereon, a first rotor that is positioned to face the stator and has the other of the magnet and the driving coil mounted thereon so as to rotate in a state where the first rotor is attracted toward the stator by magnetic force, a plurality of rolling members that rotates in accordance with the rotation of the first rotor, which is pressed from an opposite side by the stator and the first rotor, and revolves about an axis of rotation of the first rotor, and a second rotor that holds the plurality of rolling members and rotates with the driven object incorporated therein about the axis of rotation of the first rotor in accordance with the revolution of the plurality of rolling members.

Thereby, when the current is not applied to the driving coils, the rotation of the first rotor relative to the stator is regulated and the rotation of the driven object is regulated by frictional force between the first rotor and the rolling member and frictional force between the stator and the rolling member.

According to the embodiments of the present technology, when the current is not applied to the driving coils, the rotation of the first rotor relative to the stator is regulated and the rotation of the driven object is regulated by frictional force between the first rotor and the rolling member and frictional force between the stator and the rolling member. Hence, it is possible to prevent the following problems: image blur caused when current is applied in a state where the blur correction function is not executed; occurrence of noise caused by the rotation of the driven object when the apparatus is not in use; and deterioration in durability of the structure thereof.

It should be noted that the effect described herein is not necessarily limited, and may be either one of the effects described in the present disclosure.

DETAILED DESCRIPTION OF EMBODIMENTS

Hereinafter, an image blur correction device and an imaging apparatus according to embodiments of the present technology will be described with reference to the accompanying drawings.

In the embodiments to be described later, an imaging apparatus of the present technology is applied to a video camera, and an image blur correction device of the present technology is applied to an image blur correction device which is provided in the video camera.

In addition, the applicable scopes of the imaging apparatus and the image blur correction device of the present technology are not limited to the video camera, and the image blur correction device which is provided in the video camera. The imaging apparatus and the image blur correction device of the present technology can be widely applied to imaging apparatuses which are provided in various devices such as a still camera and mobile terminals including a mobile phone and the like, or image blur correction devices which are provided in such imaging apparatuses.

In the following description, front-back, vertical, and horizontal directions are indicated in terms of a direction viewed from a photographer at the time of photography using a video camera. Accordingly, the subject side is a front side, and the photographer side is a back side.

It should be noted that the front-back, vertical, and horizontal directions to be described later are directions for convenience of description, and the present technology does not have to be limited to such directions.

Further, the lens to be described later is defined to include both of a lens system formed of a single lens and a lens system formed of a plurality of lenses as a lens group.

Overall Configuration of Imaging Apparatus

Figure 1:
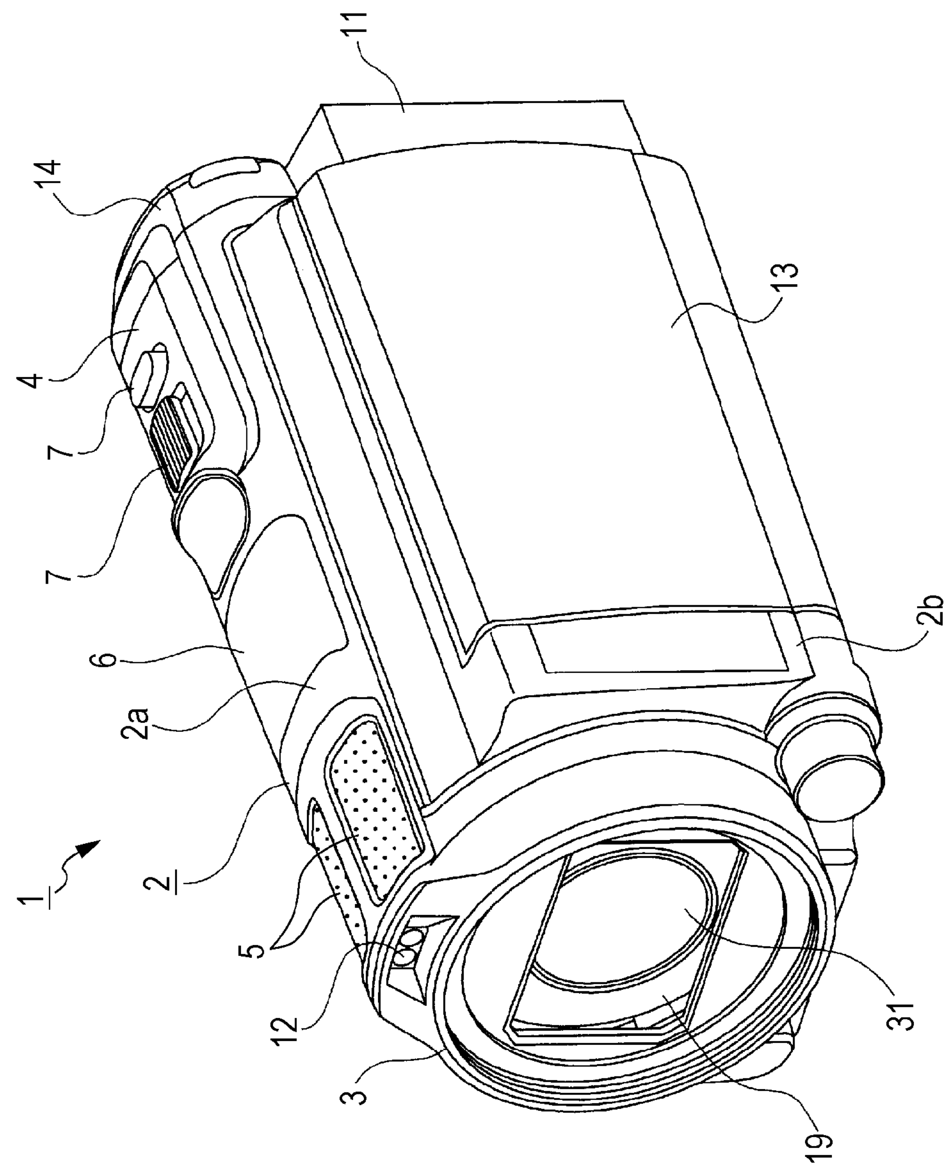
FIG. 1 is a perspective view illustrating an imaging apparatus according to an embodiment of the present technology, together with FIGS. 2 to 20.
Figure 2:
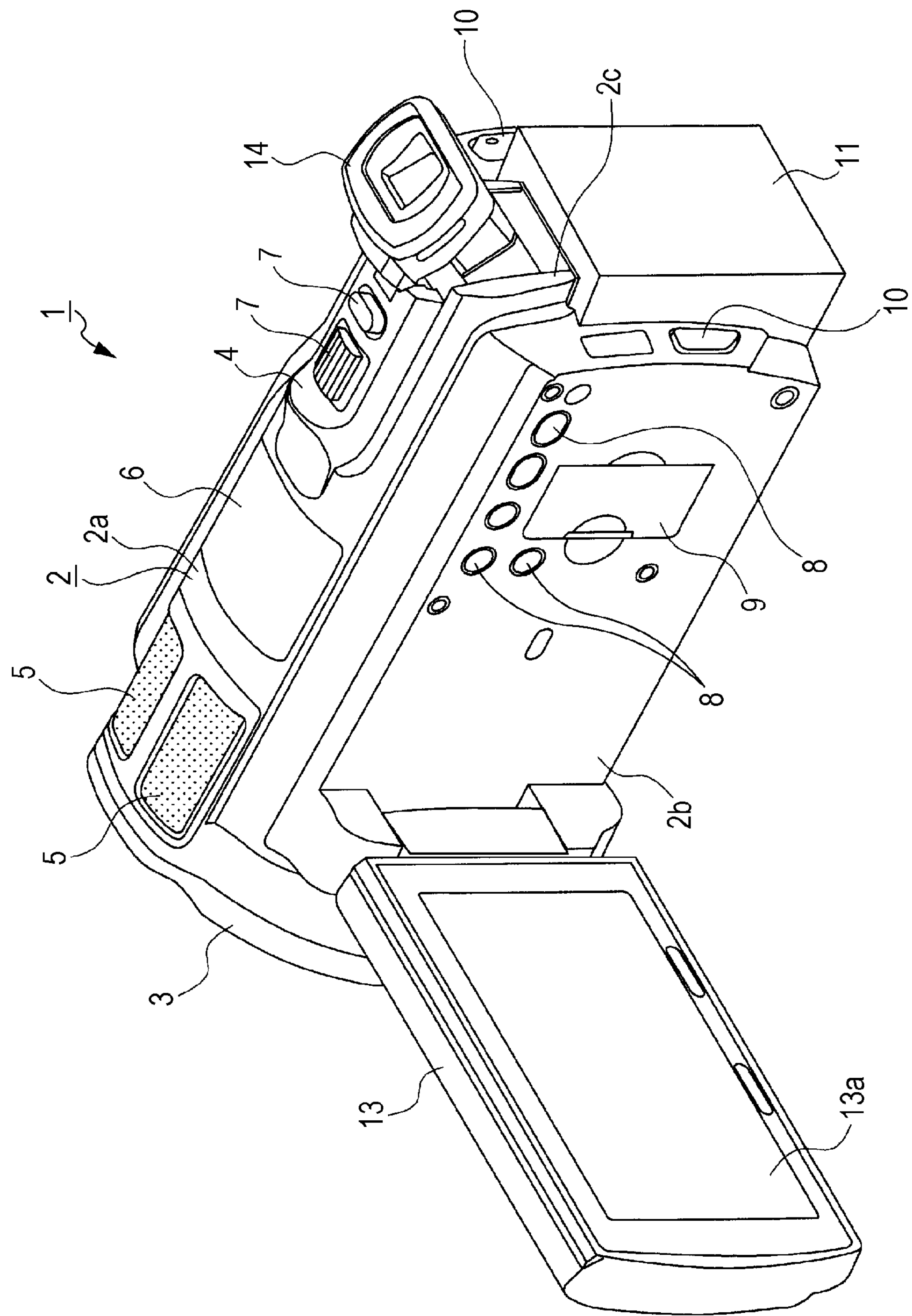
FIG. 2 is a perspective view illustrating the imaging apparatus viewed from a direction different from that of FIG. 1.

An imaging apparatus 1 is formed such that the necessary respective sections are disposed inside and outside an outer casing 2 (refer to FIGS. 1 and 2). The outer casing 2 is formed, for example, in a casing shape which is long in the front-back direction, the front end thereof is provided as a front panel section 3, and an upper end at the back end is provided as a storage casing section 4 which is open toward the back side thereof.

Microphones 5 and 5, an interface cover 6, and operation switches 7 and 7 are arranged on the upper surface 2*a* of the outer casing 2 in an order from the front side. The operation switches 7 and 7 are, for example, a zoom lever and a photography button.

Various operation buttons 8, 8, . . . such as a power button and an image reproduction button are disposed on one side surface 2*b* of the outer casing 2. A memory card not shown in the drawing is mounted on one side surface 2*b* of the outer casing 2, and the memory card is covered by cover 9.

Operation buttons 10 and 10 such as a mode switching button and a recording button are disposed on a rear surface 2*c* of the outer casing 2.

A battery 11 is mounted on the rear surface of the outer casing 2, and thus a part of the battery 11 protrudes backward from the rear surface 2*c* of the outer casing 2.

A flash 12 is disposed on the upper end of the front panel section 3. The flash 12 is used at the time of night photography or the like, and fill light is emitted forward from the flash 12.

A display section 13 is swingably and rotatably connected to the side surface portion of the outer casing 2. The display section 13 has a display surface (display) 13*a*, where the front end thereof is connected to the outer casing 2.

A finder 14 is connected to the back end of the imaging apparatus 1, and the finder 14 is slidable in the front-back direction and is rotatable in the tilt direction relative to the storage casing section 4.

The finder 14 is slidable between a storage position where a portion excluding a back end thereof is stored in the storage casing section 4 and an out position where the portion is extracted from the storage casing section 4. Further, the finder 14 is configured to be rotatable in the tilt direction about the front end thereof as a fulcrum at the out position.

Configuration of Image Blur Correction Device Inside the outer casing 2, an image blur correction device 15 is disposed (refer to FIGS. 3 to 8). The image blur correction device 15 has an outer frame 16, an inner frame 17, a holding frame 18, and a lens unit 19.

The outer frame 16 is formed in a rectangular frame shape, and is constituted by combining a first member 20 and a second member 21. The first member 20 is made of a magnetic material such as metal, and is formed of a first surface portion 22 facing in the up-down direction and a second surface portion 23 facing in the left-right direction, where a right end of the first surface portion 22 and an upper end of the second surface portion 23 are connected. An insertion alignment opening 22*a* is formed on the central portion of the first surface portion 22. A guide groove 22*b* having an annular shape, which is open upward, is formed on the first surface portion 22 outside the insertion alignment opening 22*a*. The guide groove 22*b* is formed in, for example, a V shape in cross-section, and the center thereof coincides with the center of the insertion alignment opening 22*a*.

The second member 21 is formed of a first-surface-like portion 24 facing in the up-down direction and a second-surface-like portion 25 facing in the left-right direction, where the left end of the first-surface-like portion 24 and the lower end of the second-surface-like portion 25 are connected.

The outer frame 16 is formed in a rectangular frame shape such that the right end of the first-surface-like portion 24 of the second member 21 is combined with the lower end of the second surface portion 23 of the first member 20 and the left end of the first surface portion 22 of the first member 20 is combined with the upper end of the second-surface-like portion 25 of the second member 21.

The inner frame 17 is made of a magnetic material such as metal. The inner frame 17 is disposed inside the outer frame 16, and is formed of a top surface portion 26 facing in the up-down direction and a side surface portion 27 facing in the left-right direction, where the right end of the top surface portion 26 is connected to the upper end of the side surface portion 27. A coupling opening 26*a* is formed on the central portion of the top surface portion 26. An insertion alignment opening 27*a* is formed on the central portion of the side surface portion 27. A guide groove 27*b* having an annular shape, which is open rightward, is formed on the side surface portion 27 outside the insertion alignment opening 27*a*. The guide groove 27*b* is formed in, for example, a V shape in a cross-section, and the center thereof coincides with the center of the insertion alignment opening 27*a*.

The holding frame 18 is disposed inside the inner frame 17, and is formed of an upper surface portion 28 facing in the up-down direction and a side surface portion 29 facing in the left-right direction, where the right end of the upper surface portion 28 is connected to the upper end of the side surface portion 29. A coupling opening 29*a* is formed on the central portion of the side surface portion 29.

Figure 3:
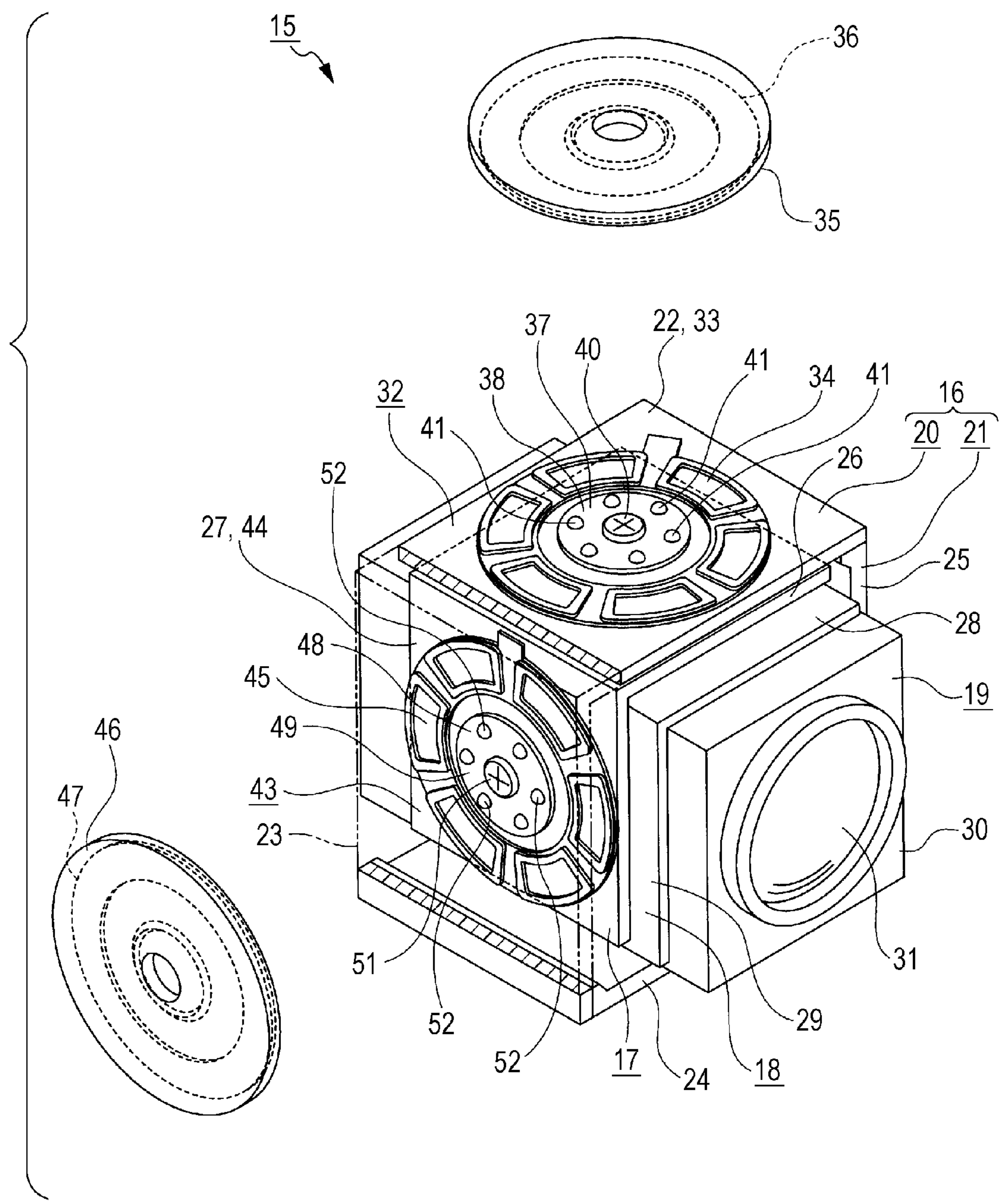
FIG. 3 is a perspective view illustrating an image blur correction device.
Figure 4:
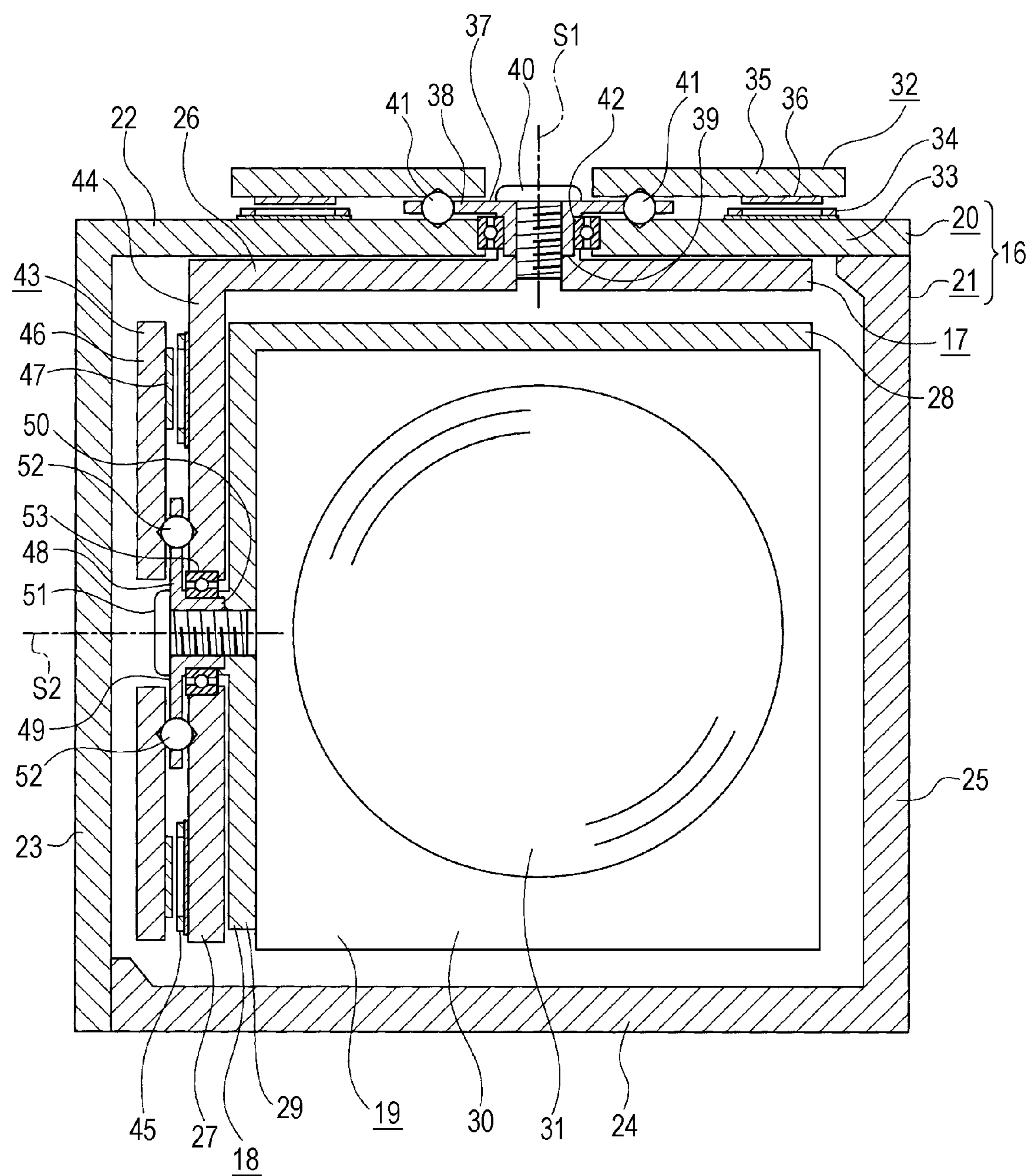
FIG. 4 is a schematically enlarged cross-sectional view of the image blur correction device.

The lens unit 19 is mounted and held on the holding frame 18 in a state where the lens unit is disposed inside the holding frame 18, and is provided as a driven object which is rotated in two directions orthogonal to each other. The lens unit 19 is disposed along the front-back direction of the barrel 30 inside the barrel 30, and has a plurality of lenses 31, 31, . . . (only one lens is shown in FIGS. 1, 3, and 4), which function as optical elements, and an imaging unit which is mounted at the back end of the barrel 30 and is not shown in the drawing. The barrel 30 is formed in a cylindrical shape which is long in the front-back direction. The imaging unit has an imaging device such as a charge coupled device (CCD) or a complementary metal-oxide semiconductor (CMOS).

A first driving motor 32 is disposed above the lens unit 19 (refer to FIGS. 3 and 4).

Figure 5:
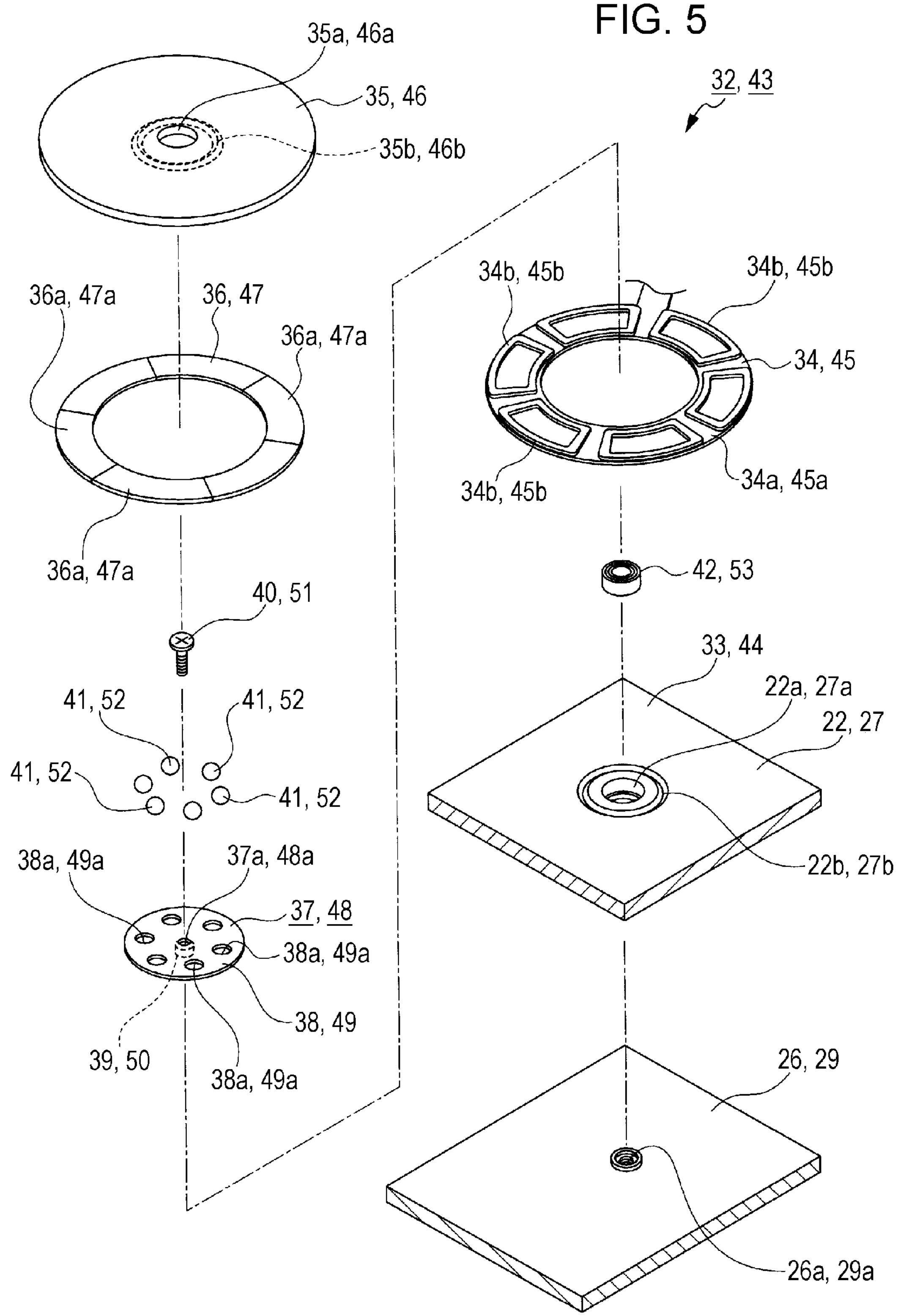
FIG. 5 is an exploded perspective view illustrating an image blur correction device.
Figure 6:
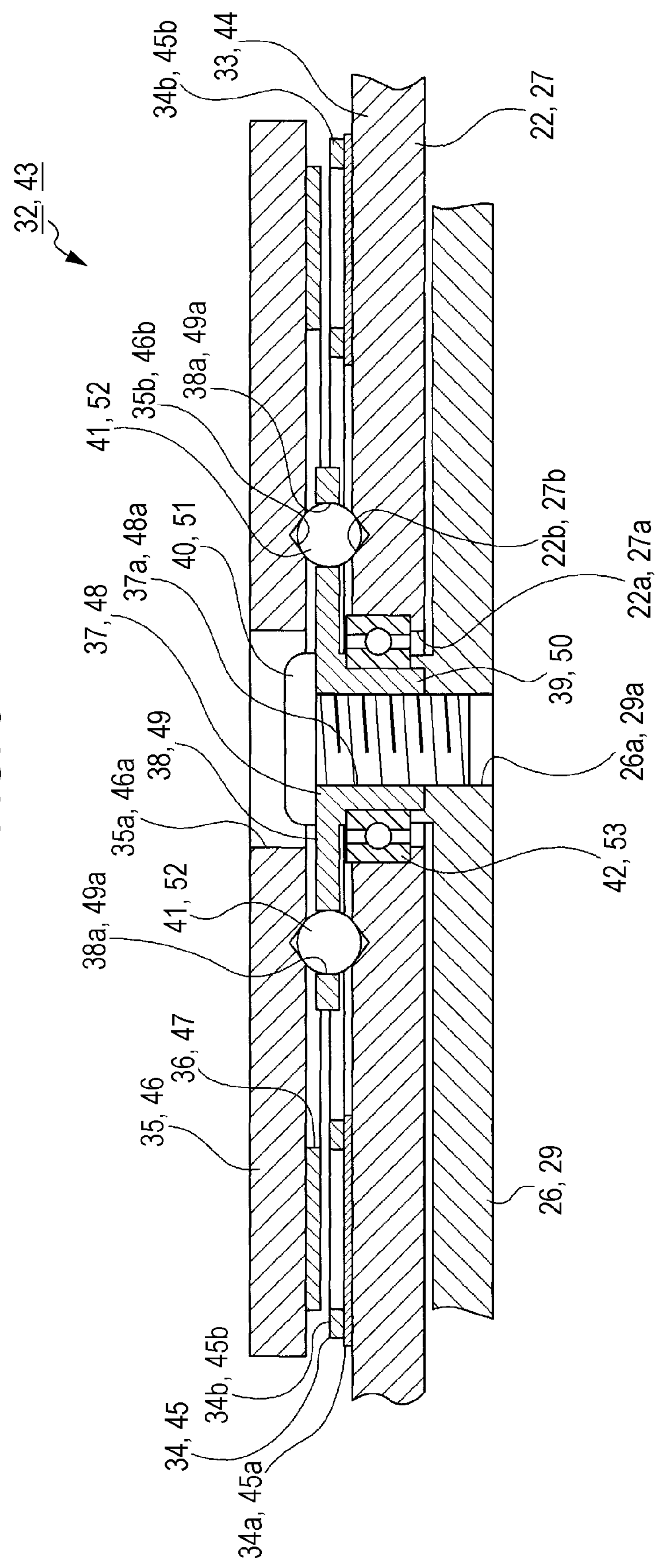
FIG. 6 is an enlarged cross-sectional view of a driving motor.

The first driving motor 32 is, for example, a flat motor, is formed as a thin film in the up-down direction, and has a stator 33, a coil body 34, a first rotor 35, a magnet 36, and a second rotor 37 (refer to FIGS. 4 to 6).

As the stator 33, the first surface portion 22 of the first member 20 in the outer frame 16 is used.

The coil body 34 has a base portion 34*a*, which has a thin annular plate shape, and a plurality of driving coils 34*b*, 34*b*, . . . which is disposed on the upper surface of the base portion 34*a* with distances between the coils in the circumferential direction. The base portion 34*a* is mounted on the upper surface of the stator 33.

Wires, which connect the driving coils 34*b*, 34*b*, . . . and are not shown in the drawing, are formed on the base portion 34*a*. The driving coils 34*b*, 34*b*, . . . are sequentially connected through the wires, for example, in the circumferential direction, and are formed in one phase. The wires are connected to the power supply circuit not shown in the drawing.

The first rotor 35 is formed in a discoid shape in the up-down direction, and the lower surface of the first rotor 35 above the stator 33 is positioned to face the upper surface of the stator 33. An insertion opening 35*a* passing in the up-down direction is formed on the central portion of the first rotor 35. A guide groove 35*b* having an annular shape, which is open downward, is formed on the first rotor 35 outside the insertion opening 35*a*. The guide groove 35*b* is positioned to face the guide groove 22*b* of the stator 33. The guide groove 35*b* is formed in, for example, a V shape in cross-section, and the center thereof coincides with the center of the insertion opening 35*a*.

The magnet 36 is formed in an annular shape, and is mounted on the lower surface of the first rotor 35. Magnetic poles 36*a*, 36*a*, . . . are attached, for example, such that N poles and S poles are alternately arranged in the circumferential direction. The magnet 36 is positioned to face the driving coils 34*b*, 34*b*, . . . of the coil body 34.

The second rotor 37 has a member holding portion 38, which is formed in a discoid shape facing in the up-down direction, and a rotation fulcrum portion 39 which is projected downward from the member holding portion 38.

Holding openings 38*a*, 38*a*, . . . passing in the up-down direction are formed at a position close to the inner circumference of the member holding portion 38 with equal distances in the circumferential direction. The rotation fulcrum portion 39 is projected downward from the central portion of the member holding portion 38, and is formed in a cylindrical shape. The rotation fulcrum portion 39 is inserted into the insertion alignment opening 22*a* formed on the first surface portion 22 of the outer frame 16.

A central axis of rotation of the second rotor 37 coincides with an axis of rotation of the first rotor 35. Accordingly, the combined size of the first rotor 35 and the second rotor 37 is reduced, and thus it is possible to reduce the size of the first driving motor 32.

A screw insertion passage opening 37*a*, which passes through the rotation fulcrum portion 39 and the central portion of the member holding portion 38, is formed on the second rotor 37.

In the second rotor 37, the rotation fulcrum portion 39 is inserted into the insertion alignment opening 22*a* of the stator 33, and the member holding portion 38 is positioned between the stator 33 and the first rotor 35. The second rotor 37 is inserted from the insertion opening 35*a* of the first rotor 35, and a screw member 40, which is inserted through the screw insertion passage opening 37*a*, is fixed onto the inner frame 17 by being threadedly mounted on the coupling opening 26*a* of the top surface portion 26.

Rigid balls 41, 41, . . . , which respectively function as rolling members, are disposed in the holding openings 38*a*, 38*a*, . . . of the second rotor 37. The diameter of each of the rigid balls 41, 41, . . . is greater than the thickness of the member holding portion 38, and a part of each ball is inserted into the guide groove 22*b* of the stator 33 and the guide groove 35*b* of the first rotor 35. At this time, the first rotor 35 is attracted toward the stator 33 by the magnetic force of the magnet 36, and the rigid balls 41, 41, . . . are pressed from the opposite side in the up-down direction by the stator 33 and the first rotor 35.

A bearing 42 is disposed in the insertion alignment opening 22*a* of the stator 33, and the bearing 42 is mounted to be fitted to the outside of the rotation fulcrum portion 39 of the second rotor 37. Accordingly, the second rotor 37 is supported on the stator 33 through the bearing 42 so as to be rotatable about the first fulcrum axis S1, which is the central axis of rotation of the rotation fulcrum portion 39, as a fulcrum. Since the second rotor 37 is fixed onto the inner frame 17, when the second rotor 37 is rotatable relative to the stator 33, the lens unit 19, the holding frame 18, and the inner frame 17 incorporated with the second rotor 37 are rotatable about the first fulcrum axis S1 as a fulcrum, relative to the outer frame 16.

As described above, in the imaging apparatus 1, the second rotor 37 is rotatable relative to the stator 33 through the bearing 42. Hence, the bearing 42 is interposed between the stator 33 and the second rotor 37, and thus it is possible to ensure a smooth rotation state in the second rotor 37.

A second driving motor 43 is disposed on the side of the lens unit 19 (refer to FIGS. 3 and 4).

The second driving motor 43 which is, for example, a flat motor, is formed as a thin film in the left-right direction, and has a stator 44, a coil body 45, a first rotor 46, a magnet 47, and a second rotor 48 (refer to FIGS. 4 to 6).

As the stator 44, the side surface portion 27 of the inner frame 17 is used.

The coil body 45 has a base portion 45*a*, which has a thin annular plate shape, and a plurality of driving coils 45*b*, 45*b*, . . . which is disposed on the outer surface of the base portion 45*a* with distances between the coils in the circumferential direction. The base portion 45*a* is mounted on the outer surface of the stator 44.

Wires, which connect the driving coils 45*b*, 45*b*, . . . and are not shown in the drawing, are formed on the base portion 45*a*. The driving coils 45*b*, 45*b*, . . . are sequentially connected through the wires, for example, in the circumferential direction, and are formed in one phase. The wires are connected to the power supply circuit not shown in the drawing.

The first rotor 46 is formed in a discoid shape in the left-right direction, and the left side surface of the first rotor 46 above the stator 44 is positioned to face the right side surface of the stator 44. An insertion opening 46*a* passing in the left-right direction is formed on the central portion of the first rotor 46. A guide groove 46*b* having an annular shape, which is open leftward, is formed on the first rotor 46 outside the insertion opening 46*a*. The guide groove 46*b* is positioned to face the guide groove 27*b* of the stator 44. The guide groove 46*b* is formed in, for example, a V shape in a cross-section, and the center thereof coincides with the center of the insertion opening 46*a*.

The magnet 47 is formed in an annular shape, and is mounted on the left side surface of the first rotor 46. Magnetic poles 47*a*, 47*a*, . . . are attached, for example, such that N poles and S poles are alternately arranged in the circumferential direction. The magnet 47 is positioned to face the driving coils 45*b*, 45*b*, . . . of the coil body 45.

The second rotor 48 has a member holding portion 49, which is formed in a discoid shape facing in the left-right direction, and a rotation fulcrum portion 50 which is projected leftward from the member holding portion 49.

Holding openings 49*a*, 49*a*, . . . passing in the left-right direction are formed at a position close to the inner circumference of the member holding portion 49 with equal distances in the circumferential direction. The rotation fulcrum portion 50 is projected leftward from the central portion of the member holding portion 49, and is formed in a cylindrical shape. The rotation fulcrum portion 50 is inserted into the insertion alignment opening 27*a* formed on the side surface portion 27 of the inner frame 17.

A central axis of rotation of the second rotor 48 coincides with an axis of rotation of the first rotor 46. Accordingly, the combined size of the first rotor 46 and the second rotor 48 is reduced, and thus it is possible to reduce the size of the second driving motor 43.

A screw insertion passage opening 48*a*, which passes through the rotation fulcrum portion 50 and the central portion of the member holding portion 49, is formed on the second rotor 48.

In the second rotor 48, the rotation fulcrum portion 50 is inserted into the insertion alignment opening 27*a* of the stator 44, and the member holding portion 49 is positioned between the stator 44 and the first rotor 46. The second rotor 48 is inserted from the insertion opening 46*a* of the first rotor 46, and a screw member 51, which is inserted through the screw insertion passage opening 48*a*, is fixed onto the holding frame 18 by being threadedly mounted on the coupling opening 29*a* of the side surface portion 29.

Rigid balls 52, 52, . . . , which respectively function as rolling members, are disposed in the holding openings 49*a*, 49*a*, . . . of the second rotor 48. The diameter of each of the rigid balls 52, 52, . . . is greater than the thickness of the member holding portion 49, and a part of each ball is inserted into the guide groove 27*b* of the stator 44 and the guide groove 46*b* of the first rotor 46. At this time, the first rotor 46 is attracted toward the stator 44 by the magnetic force of the magnet 47, and the rigid balls 52, 52, . . . are pressed from the opposite side in the left-right direction by the stator 44 and the first rotor 46.

A bearing 53 is disposed in the insertion alignment opening 27*a* of the stator 44, and the bearing 53 is mounted so as to be fitted to the outside of the rotation fulcrum portion 50 of the second rotor 48. Accordingly, the second rotor 48 is supported on the stator 44 through the bearing 53 so as to be rotatable about the second fulcrum axis S2, which is the central axis of rotation of the rotation fulcrum portion 50, as a fulcrum. Since the second rotor 48 is fixed onto the holding frame 18, when the second rotor 48 is rotatable relative to the stator 44, the lens unit 19 and the holding frame 18 incorporated with the second rotor 48 are rotatable about the second fulcrum axis S2 as a fulcrum, relative to the inner frame 17.

As described above, in the imaging apparatus 1, the second rotor 48 is rotatable relative to the stator 44 through the bearing 53. Hence, the bearing 53 is interposed between the stator 44 and the second rotor 48, and thus it is possible to ensure a smooth rotation state in the second rotor 48.

As described above, the lens unit 19 is rotated in a first direction (yawing direction) by the first driving motor 32, and is rotated in a second direction (pitching direction) by the second driving motor 43. The rotation ranges in the yawing direction and the pitching direction are set in predetermined ranges in advance, and stoppers, which are for setting the rotation ranges of the rotation directions of the lens unit 19 and are not shown in the drawing, are respectively provided on both sides in the rotation directions of the lens unit 19.

In addition, in the example of the above description, the coil bodies 34 and 45 are respectively mounted on the stators 33 and 44, and the magnets 36 and 47 are respectively mounted on the first rotors 35 and 46. Conversely, the magnets 36 and 47 may be respectively mounted on the stators 33 and 44, and the coil bodies 34 and 45 may be respectively mounted on the first rotors 35 and 46.

Operation of Image Blur Correction Device Hereinafter, a blur correction operation in the image blur correction device 15 will be described (refer to FIGS. 7 to 12).

The lens unit 19 is rotated in the yawing direction (first direction) and the pitching direction (second direction) about the first fulcrum axis S1 and the second fulcrum axis S2 as fulcrums.

Figure 7:
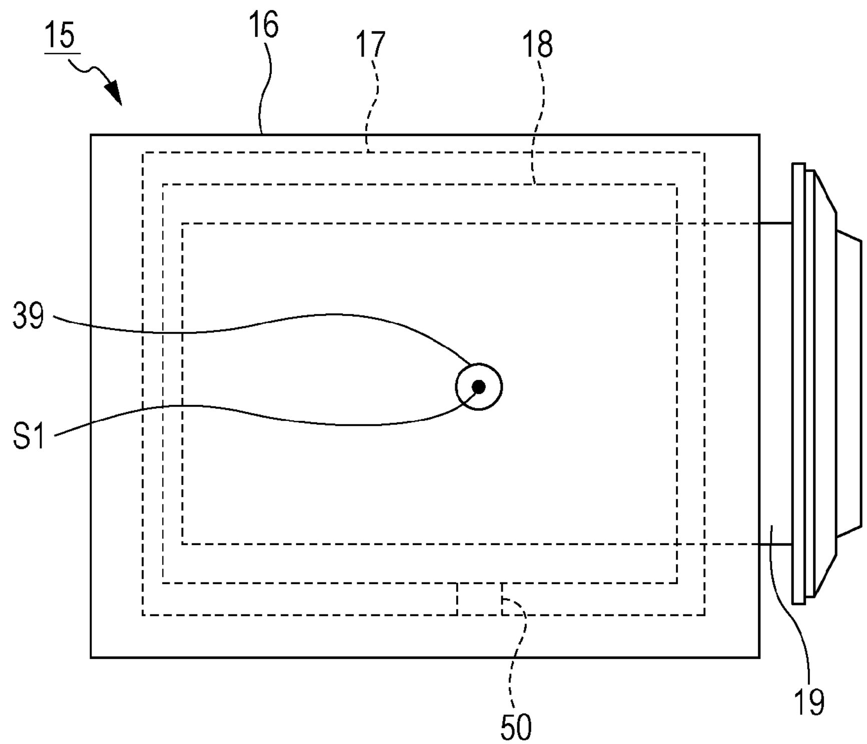
FIG. 7 is a schematic plan view illustrating a situation in which the lens unit is at the center of the rotation range in a yawing direction.
Figure 8:
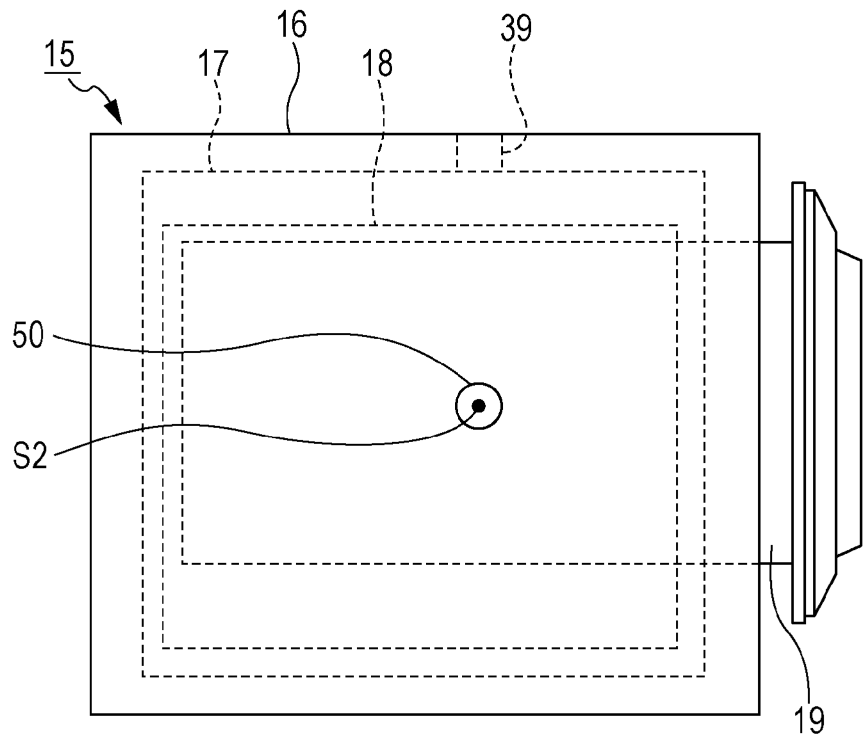
FIG. 8 is a schematic plan view illustrating a situation in which the lens unit is at the center of the rotation range in a pitching direction.
Figure 9:
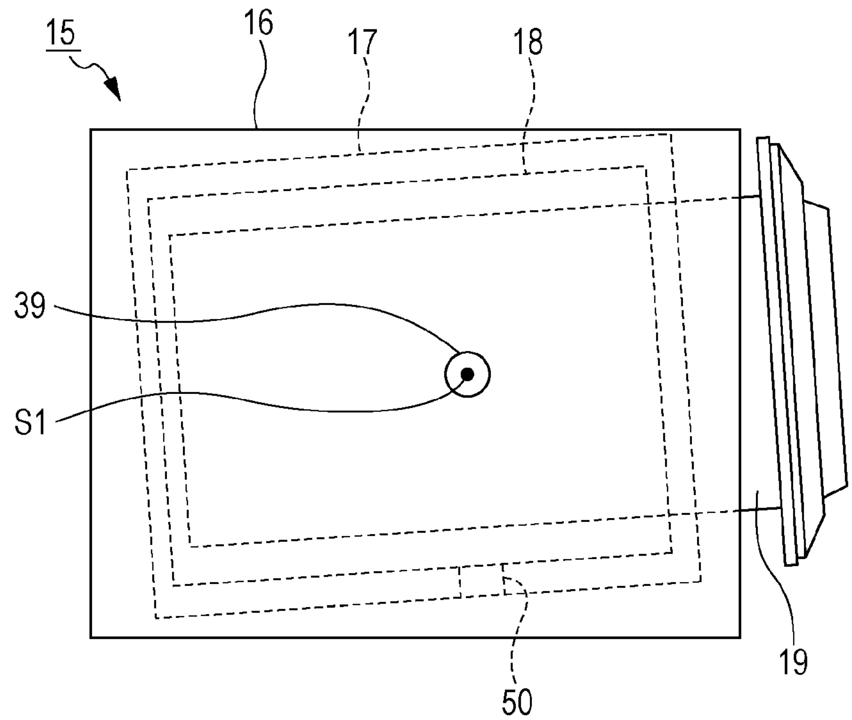
FIG. 9 is a schematic plan view illustrating a situation, in which the lens unit rotates in the yawing direction, together with FIG. 10, where the lens unit rotates toward one side in the yawing direction.
Figure 10:
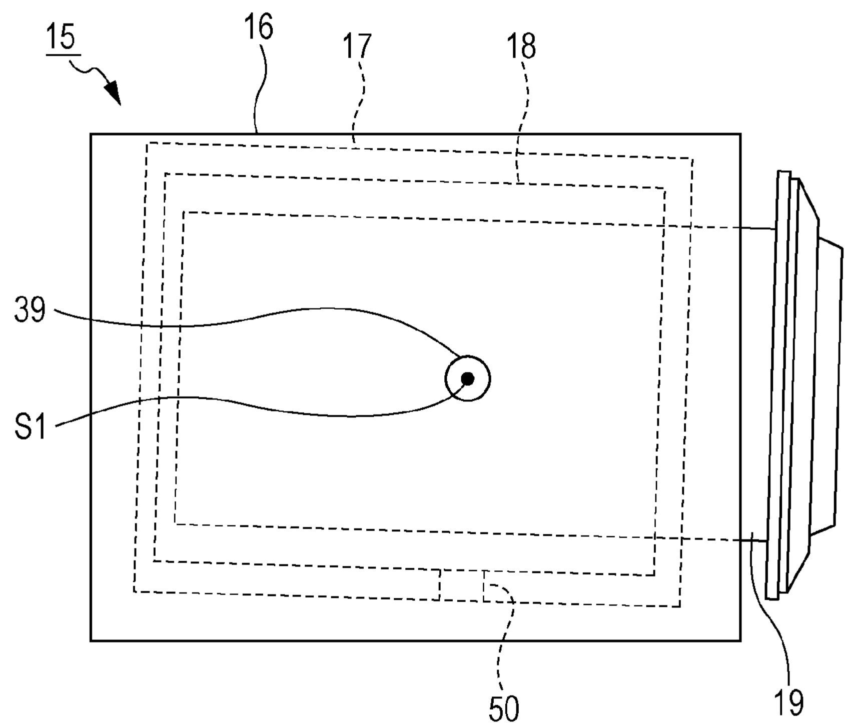
FIG. 10 is a schematic plan view illustrating a situation in which the lens unit rotates toward the other side in the yawing direction.
Figure 11:
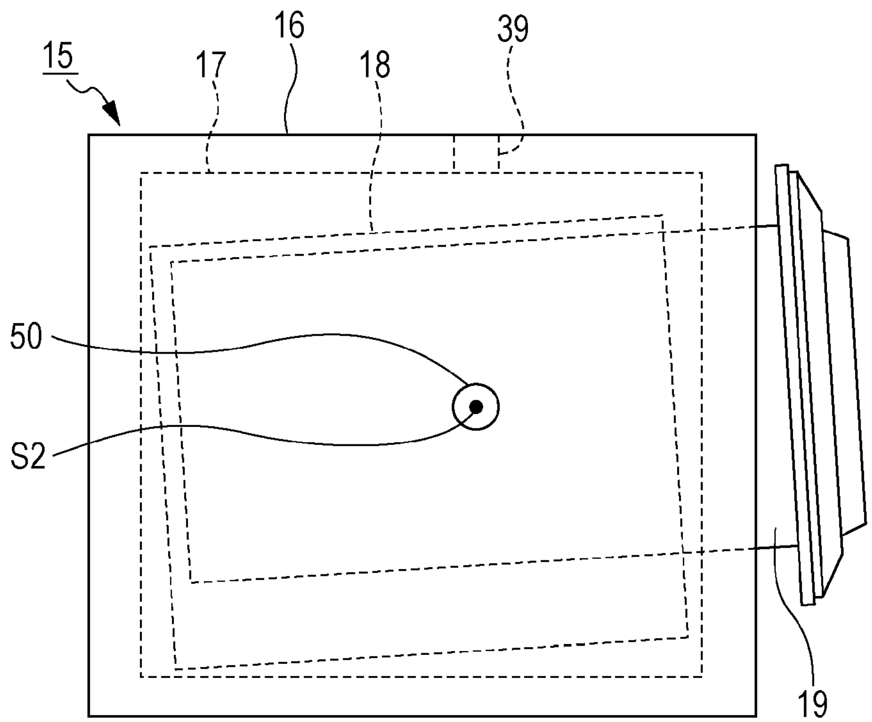
FIG. 11 is a schematic plan view illustrating a situation, in which the lens unit rotates in the pitching direction, together with FIG. 12, where the lens unit rotates toward one side in the pitching direction.
Figure 12:
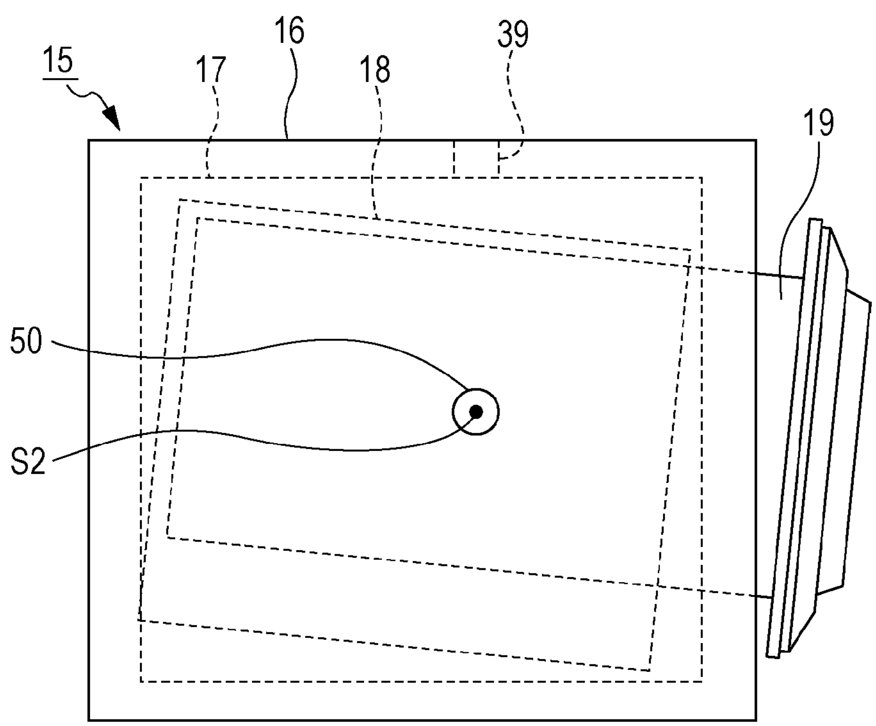
FIG. 12 is a schematic plan view illustrating a situation in which the lens unit rotates toward the other side in the pitching direction.
Figure 13:
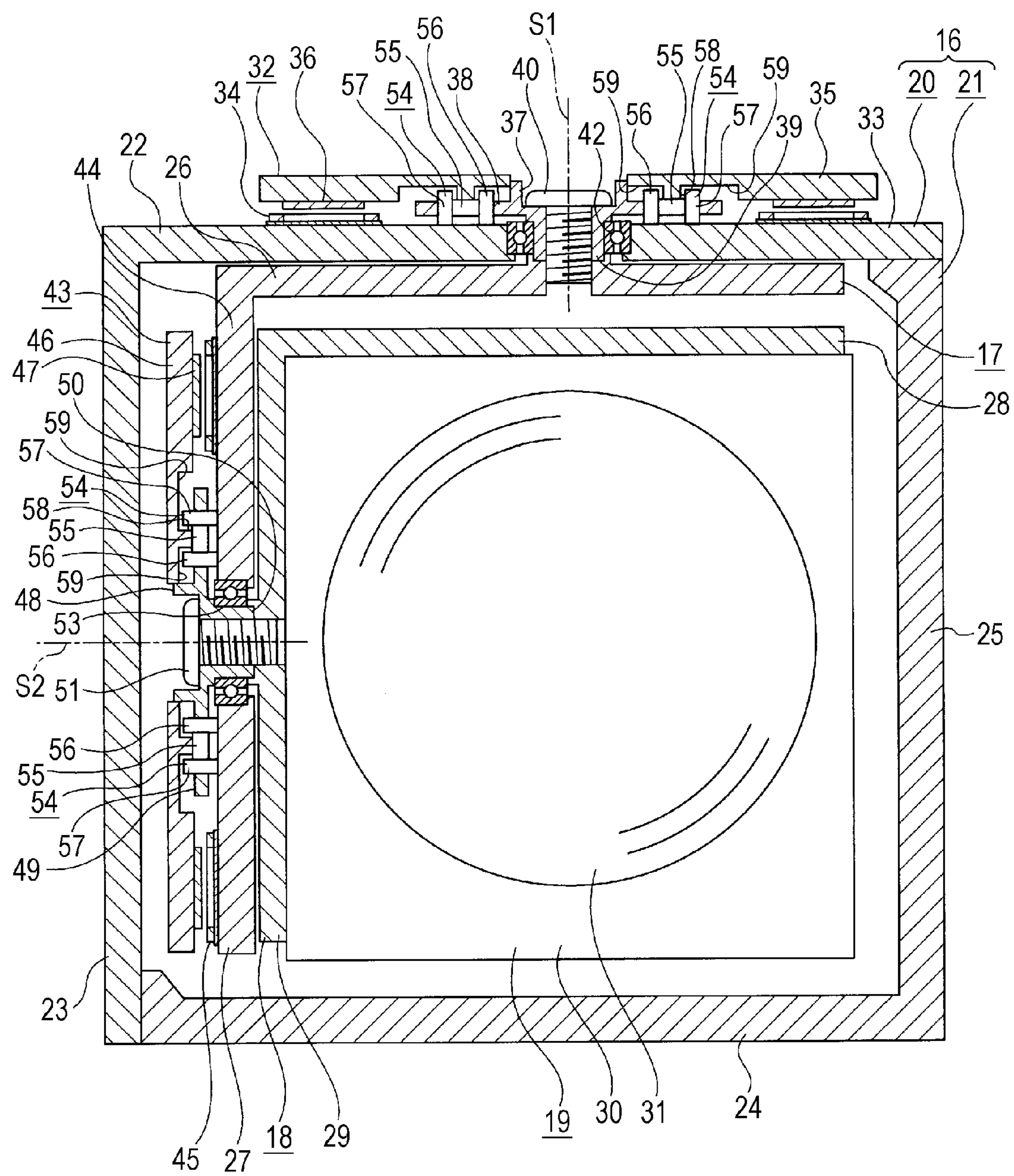
FIG. 13 is a schematically enlarged cross-sectional view illustrating the image blur correction device in an example, in which a rotating body according to a first modification example is used as a driven object, together with FIGS. 14 to 16.
Figure 14:
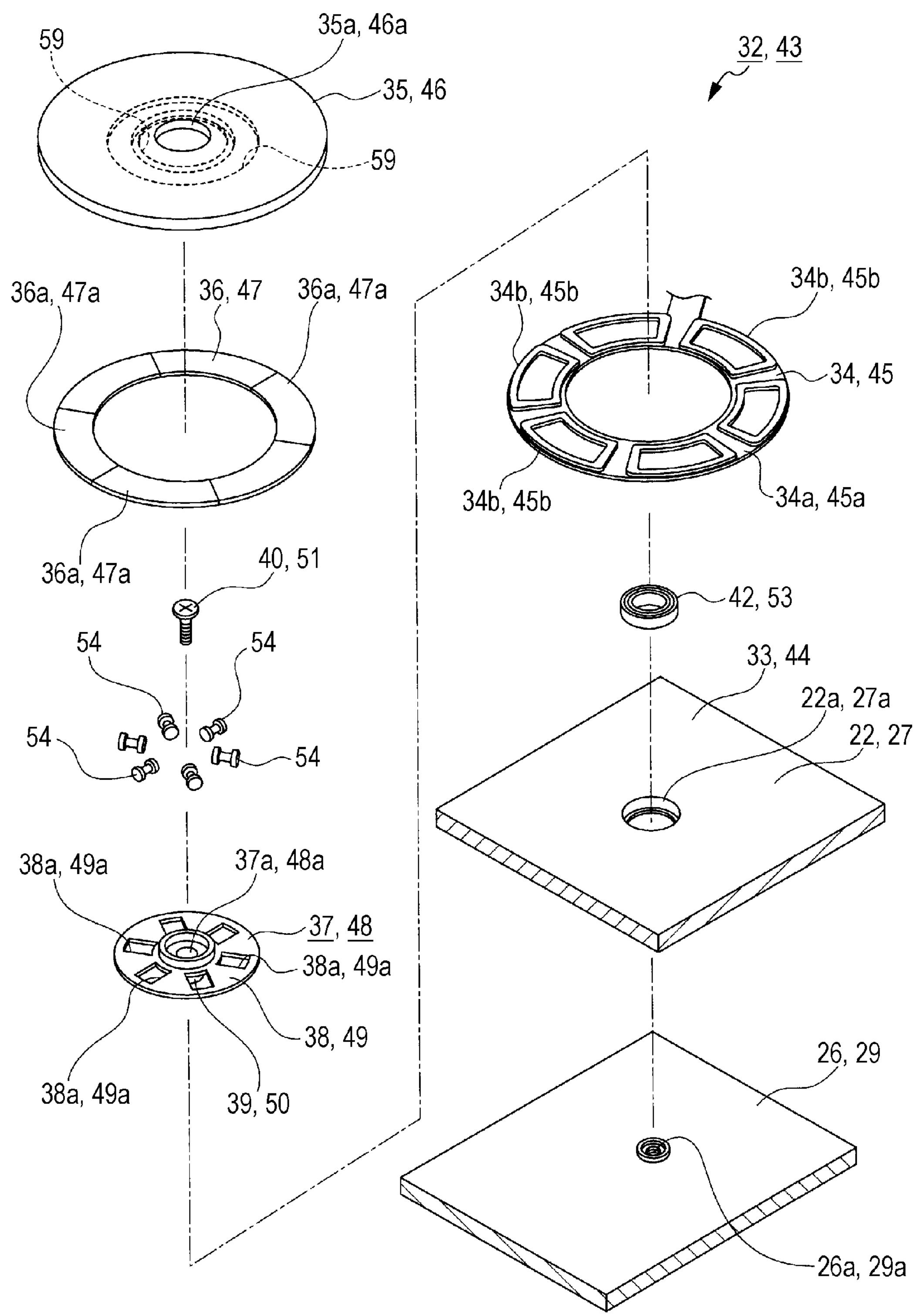
FIG. 14 is an exploded perspective view illustrating an image blur correction device.
Figure 15:
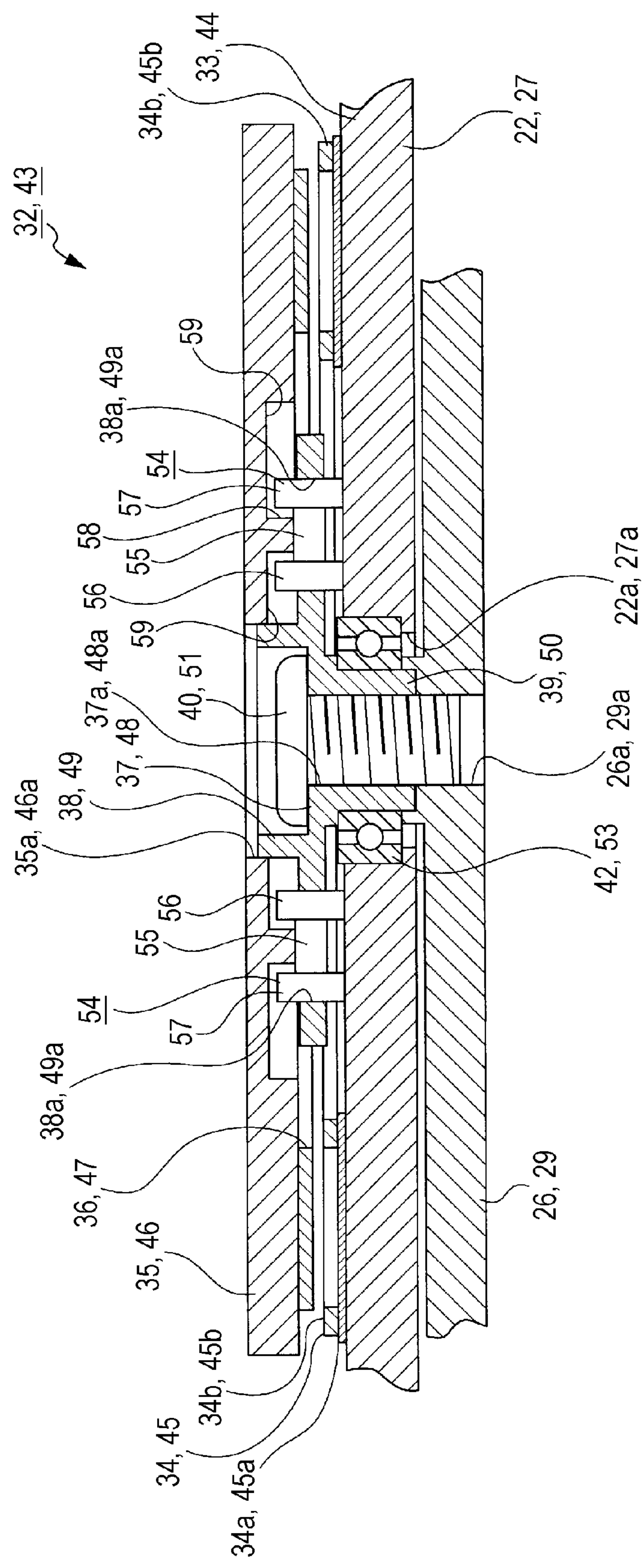
FIG. 15 is an enlarged cross-sectional view of a driving motor.

Before the lens unit 19 is rotated in the yawing direction, for example, the lens unit 19 is positioned at the center of the rotation range in the yawing direction (refer to FIG. 7). Further, before the lens unit 19 is rotated in the pitching direction, for example, the lens unit 19 is positioned at the center of the rotation range in the pitching direction (refer to FIG. 8).

The rotation of the lens unit 19 in the yawing direction is performed by supplying current to the driving coils 34*b*, 34*b*, . . . of the coil body 34 so as to generate thrust force in the first rotor 35 of the first driving motor 32 in a direction in which blur can be corrected.

When the driving coils 34*b*, 34*b*, . . . are supplied with the current and the first driving motor 32 is rotated relative to the stator 33, the rigid balls 41, 41, . . . which are held in the second rotor 37, are rotated in accordance with the rotation of the first rotor 35, and are revolved about the first fulcrum axis S1.

At this time, in accordance with the revolution of the rigid balls 41, 41, . . . , the second rotor 37 is rotated about the first fulcrum axis S1 as a fulcrum relative to the stator 33 through the bearing 42. Then, the lens unit 19, the holding frame 18, and the inner frame 17 incorporated with the second rotor 37 are rotatable about the first fulcrum axis S1 as a fulcrum, relative to the outer frame 16 (refer to FIGS. 9 and 10).

The lens unit 19 is rotated about the first fulcrum axis S1 as a fulcrum, thereby performing blur correction in the yawing direction.

When current is not supplied to the driving coils 34*b*, 34*b*, . . . of the coil body 34, thrust force is not transferred to the first driving motor 32 does not. Hence, the rotation of the first driving motor 32 is stopped, and the rotation of the lens unit 19 is stopped. At this time, the first rotor 46 is attracted toward the stator 44 by magnetic force of the magnet 47. Hence, the rotation of the first rotor 35 relative to the stator 33 is regulated by frictional force between the first rotor 35 and the rigid balls 41, 41, . . . and frictional force between the stator 33 and the rigid balls 41, 41, . . . . Thereby, the first rotor 35 is locked onto the stator 33.

In addition, in the imaging apparatus 1, when the blur correction operation in the yawing direction is terminated, the following control may be performed: current is supplied to the driving coils 34*b*, 34*b*, . . . of the coil body 34, the lens unit 19 is positioned at the center (refer to FIG. 7) of the rotation range in the yawing direction before the lens unit 19 is rotated in the yawing direction, and thereafter supplying current to the driving coils 34*b*, 34*b*, . . . is stopped.

Meanwhile, the rotation of the lens unit 19 in the pitching direction is performed by supplying current to the driving coils 45*b*, 45*b*, . . . of the coil body 45 so as to generate thrust force in the first rotor 46 of the second driving motor 43 in a direction in which blur can be corrected.

When the driving coils 45*b*, 45*b*, . . . are supplied with the current and the first driving motor 43 is rotated relative to the stator 44, the rigid balls 52, 52, . . . which are held in the second rotor 48, are rotated in accordance with the rotation of the first rotor 46, and are revolved about the second fulcrum axis S2.

At this time, in accordance with the revolution of the rigid balls 52, 52, . . . , the second rotor 48 is rotated about the second fulcrum axis S2 as a fulcrum relative to the stator 44 through the bearing 53. Then, the lens unit 19 and the holding frame 18 incorporated with the second rotor 48 are rotatable about the second fulcrum axis S2 as a fulcrum, relative to the inner frame (refer to FIGS. 11 and 12).

The lens unit 19 is rotated about the second fulcrum axis S2 as a fulcrum, thereby performing blur correction in the pitching direction.

When current is not supplied to the driving coils 45*b*, 45*b*, . . . of the coil body 45, thrust force is not transferred to the first driving motor 43. Hence, the rotation of the first driving motor 43 is stopped, and the rotation of the lens unit 19 is stopped. At this time, the first rotor 46 is attracted toward the stator 44 by magnetic force of the magnet 47. Hence, the rotation of the first rotor 46 to the stator 44 is regulated by frictional force between the first rotor 46 and the rigid balls 52, 52, . . . and frictional force between the stator 44 and the rigid balls 52, 52, . . . . Thereby, the first rotor 46 is locked onto the stator 44.

In addition, in the imaging apparatus 1, when the blur correction operation in the pitching direction is terminated, the following control may be performed: current is supplied to the driving coils 45*b*, 45*b*, . . . of the coil body 45, the lens unit 19 is positioned at the center (refer to FIG. 8) of the rotation range in the pitching direction before the lens unit 19 is rotated in the yawing direction, and thereafter supplying current to the driving coils 45*b*, 45*b*, . . . is stopped.

As described above, in the imaging apparatus 1, as the rolling members, rigid balls 41, 41, . . . , 52, 52, . . . are used.

Accordingly, in accordance with the rotations of the first rotors 35 and 46, the rigid balls 41, 41, . . . , 52, 52, . . . are rotated and revolved. Thereby, with a simple structure, it is possible to transfer rotational forces of the first rotors 35 and 46 to the second rotors 37 and 48 without increasing manufacturing costs.

Further, guide grooves 22*b*, 27*b*, 35*b*, and 46*b* are formed on the stators 33 and 44 and the first rotors 35 and 46. The grooves extend in the circumferential direction, and a part of each of the rigid balls 41, 41, . . . , 52, 52, . . . is inserted into the grooves.

Accordingly, the rigid balls 41, 41, . . . , 52, 52, . . . are guided by the guide grooves 22*b*, 27*b*, 35*b*, and 46*b*, and are revolved about the axes of rotation of the first rotors 35 and 46. Thereby, it is possible to ensure a smooth rotation state in the first rotors 35 and 46 without movement of the rigid balls 41, 41, . . . , 52, 52, . . . in the radial directions of the first rotors 35 and 46 and stators 33 and 44. Further, since a part of each of the rigid balls 41, 41, . . . , 52, 52, . . . is inserted in the guide grooves 22*b*, 27*b*, 35*b*, and 46*b*, a distance between the stator 33 and the first rotor 35 and a distance between the stator 44 and the first rotor 46 become close. As a result, it is possible to reduce the thicknesses of the first driving motor 32 and the second driving motor 43.

In addition, in the imaging apparatus 1, various photography modes, which include a tripod photography mode of performing photography in a state where the apparatus is mounted on the tripod, are set. In the imaging apparatus 1, for example, an acceleration sensor and the like, which detect acceleration of gravity and are not shown in the drawing, are provided, and the photography modes are detected on the basis of the detection results of such sensors.

In the tripod photography mode, it is not necessary to execute the blur correction function, and when the tripod photography mode is detected, an operation of positioning the lens unit 19 at the center (refer to FIG. 7) of the rotation range in the yawing direction is executed by supplying current to the driving coils 34*b*, 34*b*, . . . of the coil body 34, and the control of positioning the lens unit 19 at the center (refer to FIG. 8) of the rotation range in the pitching direction is performed by supplying current to the driving coils 45*b*, 45*b*, . . . of the coil body 45.

When the lens unit 19 is positioned at the center of the rotation range in the yawing direction and at the center of the rotation range in the pitching direction, supplying current to the driving coils 34*b*, 34*b*, . . . and driving coils 45*b*, 45*b*, . . . is stopped. At this time, the first rotor 46 is locked on the stator 44 by the frictional force between the first rotor 46 and the rigid ball 52, 52, . . . and the frictional force between the stator 44 and the rigid ball 52, 52, . . . . Hence, the lens unit 19 is held at the center of the rotation range in the yawing direction and at the center of the rotation range in the pitching direction.

Further, in the imaging apparatus 1, even when an operation of turning off power is performed, in a manner similar to that in a case where the tripod photography mode is set, the following control is performed: the lens unit 19 is positioned at the center of the rotation range in the yawing direction and at the center of the rotation range in the pitching direction. Accordingly, in the imaging apparatus 1, even when an operation of turning off power is performed, the lens unit 19 is held at the center of the rotation range in the yawing direction and at the center of the rotation range in the pitching direction.

In addition, in a state where the imaging apparatus 1 is in use, when the battery 11 is taken out, power is not supplied from the battery 11, and the lens unit 19 is at a position at the time point the battery 11 is taken out. Even in this case, the first rotor 46 is locked at a position where the first rotor 46 is held on the stator 44 by the frictional force between the first rotor 46 and the rigid ball 52, 52, . . . and the frictional force between the stator 44 and the rigid ball 52, 52, . . . .

Modification Example of Rolling Member

Hereinafter, modification examples of the rolling members will be described (refer to FIGS. 13 to 19).

First, rotating bodies 54 according to a first modification example of the rolling members will be described (refer to FIGS. 13 to 16). In addition, the rotating bodies 54 are usable instead of both the rigid balls 41 of the first driving motor 32 and the rigid ball 52 of the second driving motor 43. Hereinafter, an example, in which the rotating bodies 54 are used in the first driving motor 32, will be described.

The rotating bodies 54, 54, . . . are respectively inserted into the holding openings 38*a*, 38*a*, . . . , and are held on the second rotor 37 with equal distances in the circumferential direction.

The rotating body 54 is formed of: a connection shaft portion 55 which extends in a direction orthogonal to the axis of rotation of the first rotor 35; an inner rolling portion 56 which is mounted on one end of the connection shaft portion 55 in an axial direction thereof and which is formed in a discoid shape having an outer diameter greater than the outer diameter of the connection shaft portion 55; and an outer rolling portion 57 which is mounted on the other end of the connection shaft portion 55 in an axial direction thereof and which is formed in a discoid shape having an outer diameter greater than the outer diameter of the connection shaft portion 55. The inner rolling portion 56 is positioned to be closer to the axis of rotation of the first rotor 35 than the outer rolling portion 57.

The outer diameter of the inner rolling portion 56 is set to be equal to that of the outer rolling portion 57. Accordingly, assuming that an outer diameter of the connection shaft portion 55 is R1, an outer diameter of the inner rolling portion 56 is R2, and an outer diameter of the outer rolling portion 57 is R3, R2 and R3 are set to be greater than R1, and R2 and R3 are set to be equal.

When the rotating bodies 54 are used, on an inner circumference portion of the first rotor 35, a pressing protrusion portion 58, which is projected toward the stator 33, is provided, and concave retreat portions 59 and 59 are respectively formed on both sides of the pressing protrusion portion 58 in the radial direction.

In the first driving motor 32, the first rotor 35 is attracted toward the stator 33 by the magnetic force of the magnet 36. Hence, the connection shaft portion 55 presses the rotating bodies 54 against the stator 33 through the pressing protrusion portion 58, and the inner rolling portion 56 and the outer rolling portion 57 are pressed against the first rotor 35 by the stator 33. The inner rolling portion 56 and the outer rolling portion 57 are not in contact with the first rotor 35 through the concave retreat portions 59 and 59, respectively.

In the first driving motor 32, when the driving coils 34*b*, 34*b*, . . . are supplied with the current and the first driving motor 32 is rotated relative to the stator 33, the rotating bodies 54, 54, . . . , which are held on the second rotor 37, are rotated about the connection shaft portions 55, 55, . . . as fulcrums in accordance with the rotation of the first rotor 35. In addition, the inner rolling portions 56, 56, . . . and the outer rolling portions 57, 57, . . . roll on the stator 33, and are revolved about the first fulcrum axis S1.

At this time, in accordance with the revolution of the rotating bodies 54, 54, . . . , the second rotor 37 is rotated about the first fulcrum axis S1 as a fulcrum relative to the stator 33 through the bearing 42. Then, the lens unit 19, the holding frame 18, and the inner frame 17 incorporated with the second rotor 37 are rotatable about the first fulcrum axis S1 as a fulcrum, relative to the outer frame 16.

When current is not supplied to the driving coils 34*b*, 34*b*, . . . of the coil body 34, thrust force to the first driving motor 32 does not occur. Hence, the rotation of the first driving motor 32 is stopped, and the rotation of the lens unit 19 is stopped. At this time, the first rotor 46 is attracted toward the stator 44 by magnetic force of the magnet 47. Hence, the rotation of the first rotor 35 to the stator 33 is regulated by frictional force between the pressing protrusion portion 58 of the first rotor 35 and the rotating bodies 54, 54, . . . and frictional force between the stator 33 and the rotating bodies 54, 54, . . . . Thereby, the first rotor 35 is locked on the stator 33.

As described above, when the rotating bodies 54, 54, . . . are used as the rolling members, in accordance with the rotations of the first rotors 35 and 46, the rotating bodies 54, 54, . . . are rotated and revolved. Thereby, with a simple structure, it is possible to transfer rotation forces of the first rotors 35 and 46 to the second rotors 37 and 48 without increasing manufacturing costs.

Figure 16:
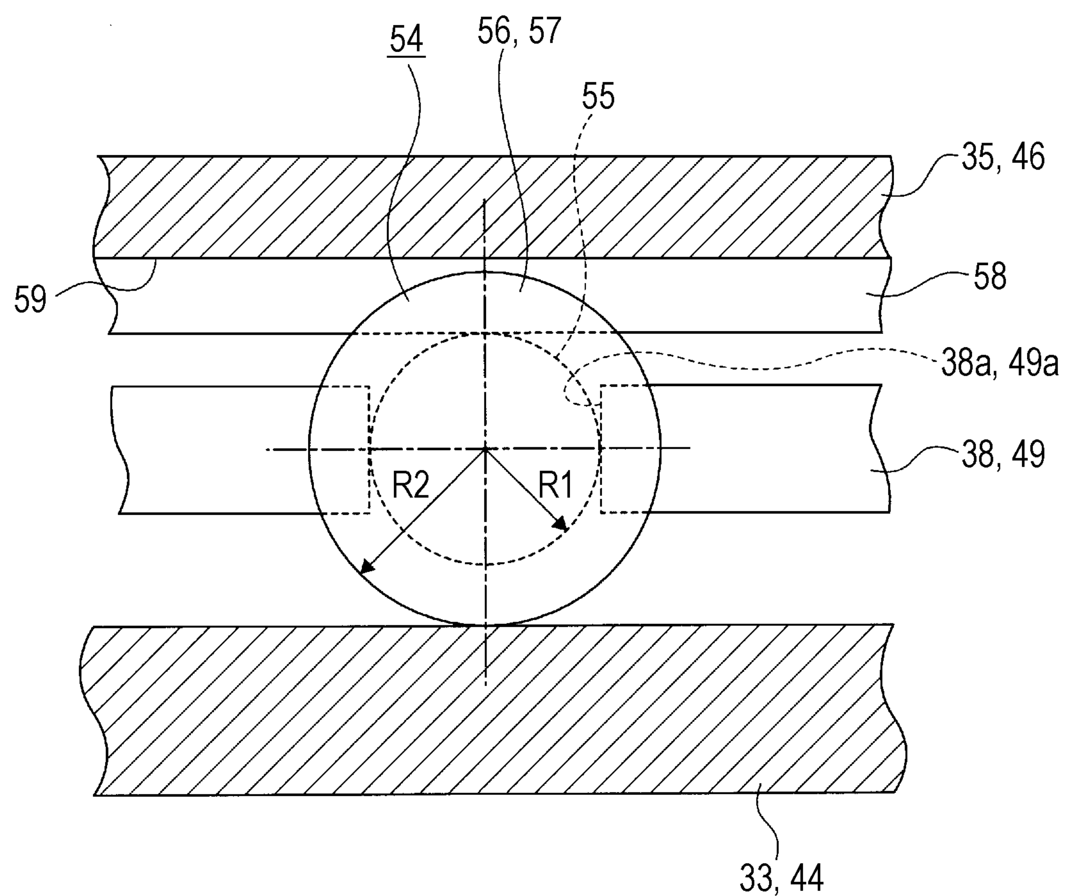
FIG. 16 is a conceptual diagram illustrating the magnitude of a relationship between a connection shaft portion and a rolling portion.

Further, the rotating body 54 is formed of the connection shaft portion 55, the inner rolling portion 56, and the outer rolling portion 57, and is configured such that the outer diameters of the connection shaft portion 55, the inner rolling portion 56, and the outer rolling portion 57 are different (refer to FIG. 16). Thereby, the second rotors 37 and 48 are rotated at reduced speeds relative to the first rotors 35 and 46. For example, when a ratio of the outer diameter R1 of the connection shaft portion 55 to the outer diameters R2 and R3 of the inner rolling portion 56 and the outer rolling portion 57 is 1:2, a speed reduction ratio is 2. Thus, when the first rotors 35 and 46 are rotated once, the second rotors 37 and 48 are rotated by a half turn.

When the rotating bodies 54 are used as the rolling members in such a manner, the second rotors 37 and 48 are rotated at reduced speeds relative to the first rotors 35 and 46, and the speed of the lens unit 19 rotating in accordance with the second rotors 37 and 48 is also reduced. Hence, it is possible to achieve reduction in size through improvement in the resolving powers and reduction in torques of the first driving motor 32 and the second driving motor 43.

In the example of the above description, the connection shaft portion 55 presses the rotating bodies 54 through the first rotor 35, and the inner rolling portion 56 and the outer rolling portion 57 are pressed by the stator 33. Conversely, the following configuration may be adopted: the connection shaft portion 55 is pressed by the stator 33, and the inner rolling portion 56 and the outer rolling portion 57 are pressed by the first rotor 35.

Further, the ratio of the outer diameter R1 of the connection shaft portion 55 to the outer diameters R2 and R3 of the inner rolling portion 56 and the outer rolling portion 57 is not limited to 1:2, and may be set as an arbitrary ratio.

Figure 17:
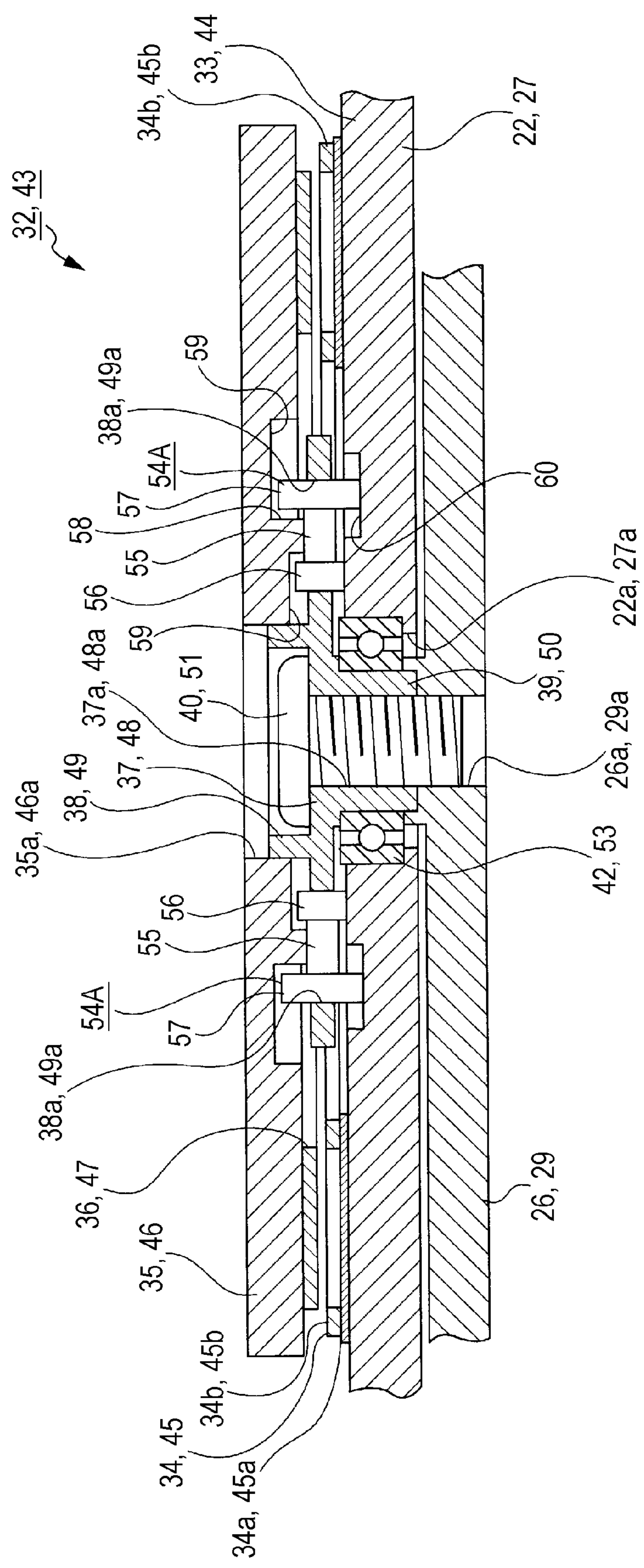
FIG. 17 is an enlarged cross-sectional view illustrating the driving motor in an example, in which a rotating body according to a second modification example is used as the driven object, together with FIGS. 18 to 19.
Figure 18:
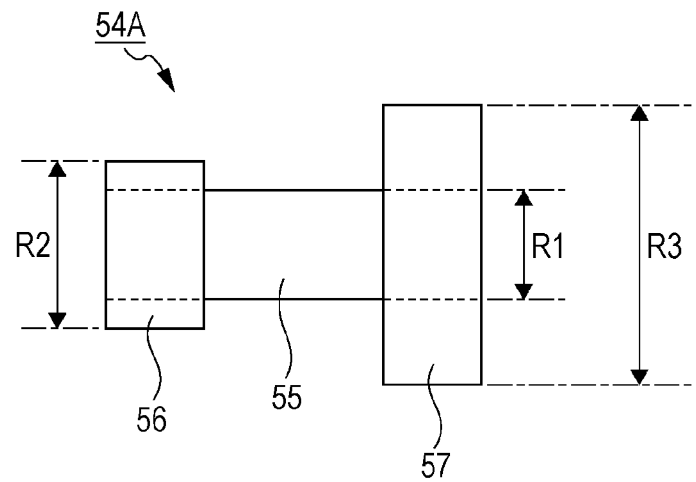
FIG. 18 is a conceptual diagram illustrating the magnitude of a relationship between the connection shaft portion, an inner rolling portion, and an outer rolling portion.

Next, rotating bodies 54A according to a second modification example of the rolling members will be described (refer to FIGS. 17 to 19). In addition, the rotating bodies 54A are usable instead of both the rigid balls 41 of the first driving motor 32 and the rigid ball 52 of the second driving motor 43. Hereinafter, an example, in which the rotating bodies 54A are used in the first driving motor 32, will be described. Further, the rotating bodies 54A are different from the rotating bodies 54 only in that the outer diameters of the inner rolling portion 56 and the outer rolling portion 57 are different from each other. Hence, hereinafter, a configuration different from that of the rotating bodies 54 will be mainly described.

The rotating bodies 54A, 54A, . . . are respectively inserted into the holding openings 38*a*, 38*a*, . . . , and are held on the second rotor 37 with equal distances in the circumferential direction.

The rotating body 54A is formed of the connection shaft portion 55, the inner rolling portion 56, and the outer rolling portion 57.

The outer diameter of the outer rolling portion 57 is greater than the outer diameter of the inner rolling portion 56. Accordingly, assuming that an outer diameter of the connection shaft portion 55 is R1, an outer diameter of the inner rolling portion 56 is R2, and an outer diameter of the outer rolling portion 57 is R3, R2 and R3 are set to be greater than R1, and R3 is set to be greater than R2 (refer to FIG. 18).

When the rotating bodies 54A are used, on an inner circumference portion of the first rotor 35, a pressing protrusion portion 58, which is projected toward the stator 33, is provided, and concave retreat portions 59 and 59 are respectively formed on both sides of the pressing protrusion portion 58 in the radial direction. Further, a concave insertion portion 60, into which a part of the outer rolling portion 57 is inserted, is formed on the stator 33. Thereby, by inserting a part of the outer rolling portion 57 into the concave insertion portion 60, the connection shaft portion 56 is positioned to be orthogonal to the axis of rotation of the first rotor 35.

In the first driving motor 32, the first rotor 35 is attracted toward the stator 33 by the magnetic force of the magnet 36. Hence, the connection shaft portion 55 presses the rotating bodies 54A against the stator 33 through the pressing protrusion portion 58, and the inner rolling portion 56 and the outer rolling portion 57 are pressed against the first rotor 35 by the stator 33. The inner rolling portion 56 and the outer rolling portion 57 are not in contact with the first rotor 35 through the concave retreat portions 59 and 59, respectively.

In the first driving motor 32, when the driving coils 34*b*, 34*b*, . . . are supplied with the current and the first driving motor 32 is rotated relative to the stator 33, the rotating bodies 54A, 54A, . . . , which are held on the second rotor 37, are rotated about the connection shaft portions 55, 55, . . . as fulcrums in accordance with the rotation of the first rotor 35. In addition, the inner rolling portions 56, 56, . . . and the outer rolling portions 57, 57, . . . roll on the stator 33, and are revolved about the first fulcrum axis S1.

At this time, in accordance with the revolution of the rotating bodies 54A, 54A, . . . , the second rotor 37 is rotated about the first fulcrum axis S1 as a fulcrum relative to the stator 33 through the bearing 42. Then, the lens unit 19, the holding frame 18, and the inner frame 17 incorporated with the second rotor 37 are rotatable about the first fulcrum axis S1 as a fulcrum, relative to the outer frame 16.

When current is not supplied to the driving coils 34*b*, 34*b*, . . . of the coil body 34, thrust force to the first driving motor 32 does not occur. Hence, the rotation of the first driving motor 32 is stopped, and the rotation of the lens unit 19 is stopped. At this time, the first rotor 46 is attracted toward the stator 44 by magnetic force of the magnet 47. Hence, the rotation of the first rotor 35 to the stator 33 is regulated by frictional force between the pressing protrusion portion 58 of the first rotor 35 and the rotating bodies 54A, 54A, . . . and frictional force between the stator 33 and the rotating bodies 54A, 54A, . . . . Thereby, the first rotor 35 is locked on the stator 33.

As described above, when the rotating bodies 54A, 54A, . . . are used as the rolling members, in accordance with the rotations of the first rotors 35 and 46, the rotating bodies 54A, 54A, . . . are rotated and revolved. Thereby, with a simple structure, it is possible to transfer rotation forces of the first rotors 35 and 46 to the second rotors 37 and 48 without increasing manufacturing costs.

Further, the rotating body 54 revolved about the first fulcrum axis S1 as a fulcrum. At the time of revolution, a distance of rolling of the outer rolling portion 57 on the stator 33 is greater than a distance of rolling of the inner rolling portion 56 on the stator 33. However, the outer diameter R3 of the outer rolling portion 57 is greater than the outer diameter R2 of the inner rolling portion 56.

Accordingly, the inner rolling portion 56 and the outer rolling portion 57 are unlikely to slip over the first rotors 35 and 46 and stators 33 and 44. In addition, it is possible to ensure a smooth rotation state and a smooth revolution state of the rotating bodies 54A. As a result, it is possible to suppress occurrence of noise in the first driving motor 32 and the second driving motor 43.

Figure 19:
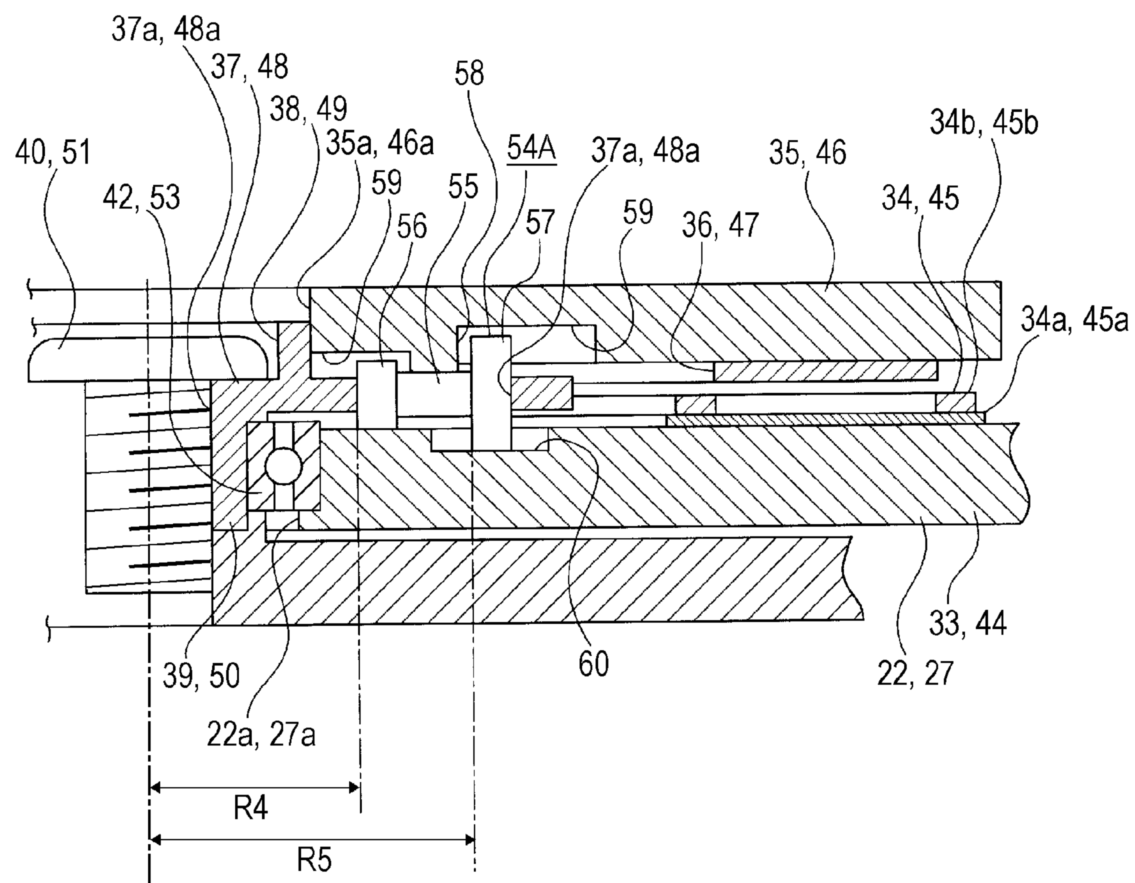
FIG. 19 is a conceptual diagram illustrating a relationship between the sizes of the respective sections.

In addition, when the rotating bodies 54A are used as the rolling members, as shown in FIG. 19, it is preferable to satisfy the following expression. Assuming that a distance from the first fulcrum axis S1 and the second fulcrum axis S2 to the inner rolling portion 56 in the direction orthogonal to the first fulcrum axis S1 and the second fulcrum axis S2 is R4, and a distance from the first fulcrum axis S1 and the second fulcrum axis S2 to the outer rolling portion 57 in the direction orthogonal to the first fulcrum axis S1 and the second fulcrum axis S2 is R5, $$R5/R4=R3/R2.$$

By forming the first driving motor 32 and the second driving motor 43 so as to establish R5/R4=R3/R2, the inner rolling portion 56 and the outer rolling portion 57 do not slip over the first rotors 35 and 46 and stators 33 and 44, and it is possible to ensure a smooth rotation state and a smooth revolution state of the rotating bodies 54A. As a result, it is possible to further suppress occurrence of noise in the first driving motor 32 and the second driving motor 43.

Embodiment of Imaging Apparatus

Figure 20:
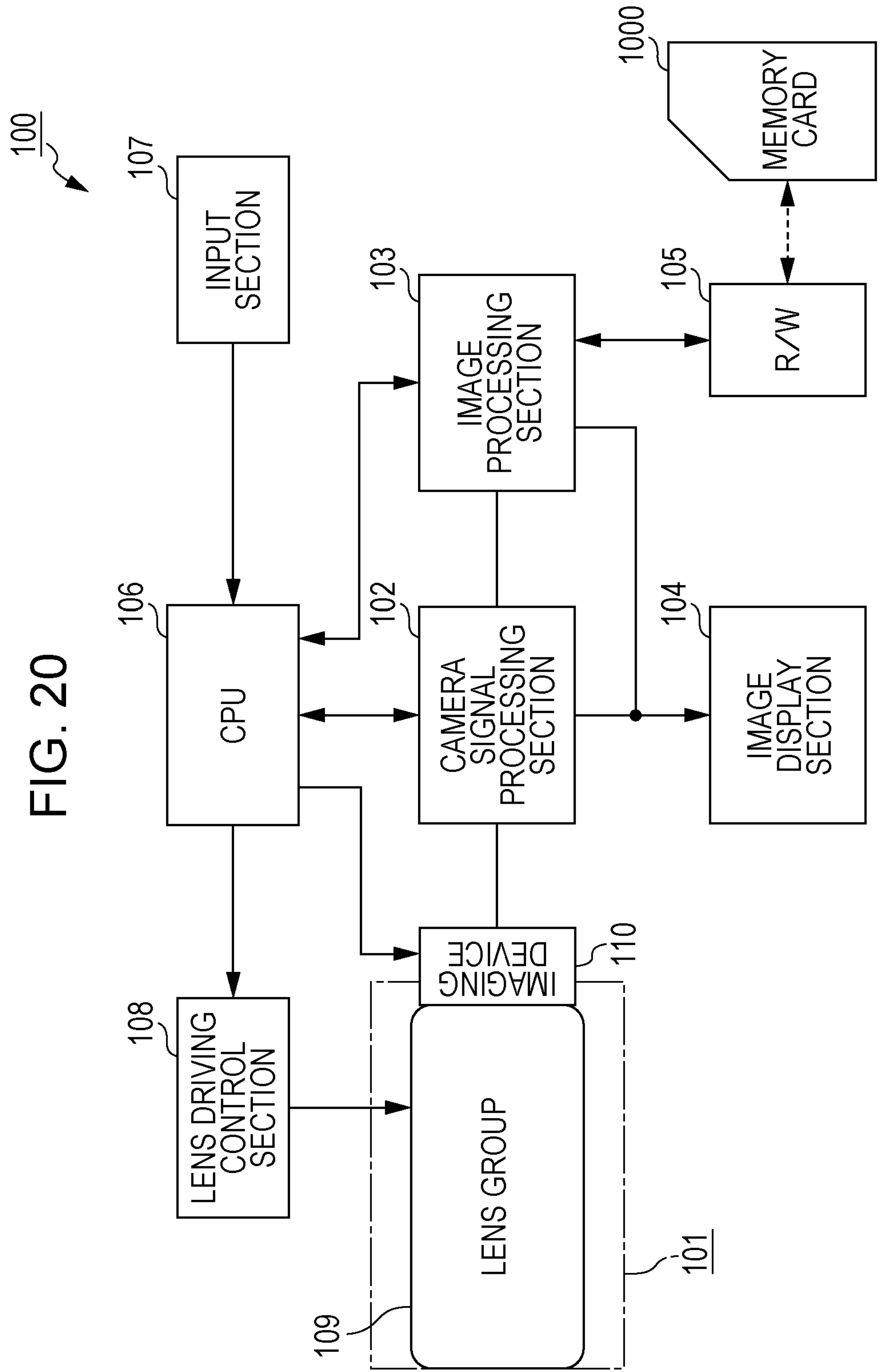
FIG. 20 is a block diagram of an imaging apparatus.

FIG. 20 is a block diagram of a video camera as an imaging apparatus according to an embodiment of the present technology.

An imaging apparatus (video camera) 100 (corresponds to an imaging apparatus 1) includes: a lens unit 101 (corresponding to lens unit 19) that is in charge of an imaging function; a camera signal processing section 102 that performs signal processing such as analog-digital conversion on a photographed image signal; and an image processing section 103 that performs recording reproduction processing on an image signal. Further, the imaging apparatus 100 includes: an image display section 104 (corresponding to the display section 13) such as a liquid crystal panel that displays the photographed image and the like; a reader/writer (R/W) 105 that writes and reads the image signal into and from a memory card 1000; a central processing unit (CPU) 106 that controls the entire imaging apparatus 100; an input section 107 (corresponding to the operation switch 7, the operation button 8, and the operation button 10) that is formed of various switches and the like for causing a user to perform necessary operations; and a lens driving control section 108 that controls driving of the lens disposed in the lens unit 101.

The lens unit 101 includes: an optical system that includes a lens group 109 (corresponding to the lenses 31, 31, . . . provided in the lens unit 19); an imaging device 110 (corresponding to the imaging device provided in the imaging unit) such as a charge coupled device (CCD) or a complementary metal-oxide semiconductor (CMOS); and the like.

The camera signal processing section 102 performs various kinds of signal processing such as conversion of an output signal from the imaging device 110 into a digital signal, noise removal, image quality correction, and conversion into a luminance color difference signal.

The image processing section 103 performs compression coding and expansion decoding processing on the image signal based on a predetermined image data format, processing of converting data specification such as resolution, and the like.

The image display section 104 has a function of displaying a state of a user's operation performed on the input section 107 and various kinds of data such as the photographed image.

The R/W 105 writes the image data, which is encoded by the image processing section 103, into the memory card 1000, and reads the image data which is recorded into the memory card 1000.

The CPU 106 functions as a control processing unit that controls respective circuit blocks provided in the imaging apparatus 100, and controls the respective circuit blocks on the basis of an instruction input signal from the input section 107 and the like.

The input section 107 outputs the instruction input signal according to the user's operation to the CPU 106.

The lens driving control section 108 controls a not-shown motor that drives the lenses of the lens group 109 on the basis of the control signal sent from the CPU 106.

The memory card 1000 is, for example, a semiconductor memory that is detachable from a slot connected to the R/W 105.

Hereinafter, operations of the imaging apparatus 100 will be described.

In a photography standby state, under the control performed by the CPU 106, the signal of the image photographed by lens unit 101 is output to the image display section 104 through the camera signal processing section 102, and is displayed as a camera live view. Further, when the instruction input signal for zooming sent from the input section 107 is input, the CPU 106 outputs the control signal to the lens driving control section 108, and thereby a predetermined lens of the lens group 109 is moved on the basis of the control of the lens driving control section 108.

When a not-shown shutter of the lens unit 101 is operated by the instruction input signal sent from the input section 107, the photographed image signal is output from the camera signal processing section 102 to the image processing section 103, and is subjected to the compression coding processing so as to be converted into digital data with a predetermined data format. The converted data is output to the R/W 105, and is written into the memory card 1000.

Focusing and zooming are performed by causing the lens driving control section 108 to move the predetermined lens of the lens group 109 on the basis of the control signal sent from the CPU 106.

When the image data recorded in the memory card 1000 is reproduced, in response to the operation of the input section 107, the predetermined image data is read from the memory card 1000 through the R/W 105, and is subjected to the expansion decoding processing through the image processing section 103. Thereafter, the reproduced image signal is output to the image display section 104, and a reproduced image is displayed.

CONCLUSION

As described above, in the imaging apparatus 1, when the current is not applied to the driving coils 34*b*, 34*b*, . . . , 45*b*,

45*b*, . . . , the rotations of the first rotors 35 and 46 relative to the stators 33 and 44 is regulated by the frictional force between the second rotors 37 and 48 and the rigid balls 41, 41, . . . , 52, 52, . . . or rotating bodies 54, 54, . . . , 54A, 54A, . . . and the frictional force between the stators 33 and 44 and the rigid balls 41, 41, . . . , 52, 52, . . . or rotating bodies 54, 54, . . . , 54A, 54A, . . . . As a result, the rotation of the lens unit 19 is regulated.

Accordingly, when current is not applied to the driving coils 34*b*, 34*b*, . . . , 45*b*, 45*b*, . . . by which the blur correction function is not executed, image blur may not occur. In this case, when the imaging apparatus 1 is not used, the lens unit 19 is not rotated, and it is possible to prevent problems of occurrence of noise and deterioration in durability of the structure thereof from occurring.

Further, the insertion alignment openings 22*a* and 27*a* are formed on the central portions of the stators 33 and 44, and a part of each of the second rotors 37 and 48 is disposed in each of the insertion alignment openings 22*a* and 27*a*.

Accordingly, the second rotors 37 and 48, each of which a part is disposed at each central portion of the stators 33 and 44, are rotated relative to the stators 33 and 44. Hence, it is possible to achieve reduction in size of the imaging apparatus 1.

Furthermore, the imaging apparatus 1 is provided with the first driving motor 32, which rotates the lens unit 19 in the first direction as the axial rotation direction of the first fulcrum axis S1, and the second driving motor 43 which rotates the lens unit 19 in the second direction as the axial rotation direction of the second fulcrum axis S2.

Accordingly, the first driving motor 32 rotates the lens unit 19 in the first direction, and the second driving motor 43 rotates the lens unit 19 in the second direction. Hence, it is possible to achieve improvement in image quality by performing blur correction by two directions orthogonal to each other.

In the example of the above description, the lens unit 19 is provided as the driven object which is rotatable. However, the driven object is not limited to the lens unit 19. For example, the driven object may be a single lens, and may be a different optical element such as an imaging device, and such an optical element may be configured to perform blur correction through rotation.

Present Technology

The present technology may adopt the following configurations:

(1)

An image blur correction device including a driving motor that rotates a driven object, which has at least one optical element in order to correct image blur, in an axial rotation direction of a fulcrum axis orthogonal to an optical axis of the optical element, in which the driving motor includes a stator that has either one of a magnet and a driving coil mounted thereon, a first rotor that is positioned to face the stator and has the other of the magnet and the driving coil mounted thereon so as to rotate in a state where the first rotor is attracted toward the stator by magnetic force, a plurality of rolling members that rotates in accordance with rotation of the first rotor, which is pressed from an opposite side by the stator and the first rotor, and revolves about an axis of rotation of the first rotor, and a second rotor that holds the plurality of rolling members and rotates with the driven object incorporated therein about the axis of rotation of the first rotor in accordance with revolution of the plurality of rolling members.

(2)

The image blur correction device according to (1), in which an insertion alignment opening is formed on the central portion of the stator, and in which at least a part of the second rotor is disposed in the insertion alignment opening.

(3)

The image blur correction device according to (2), in which a bearing is disposed in the insertion alignment opening, and in which the second rotor rotates about the stator through the bearing.

(4)

The image blur correction device according to any one of (1) to (3), in which as the fulcrum axis, a first fulcrum axis orthogonal to the optical axis of the optical element and a second fulcrum axis orthogonal to both the optical axis and the first fulcrum axis are formed, in which a first driving motor, which rotates the driven object in a first direction as an axial rotation direction of the first fulcrum axis, is provided, and in which a second driving motor, which rotates the driven object in a second direction as an axial rotation direction of the second fulcrum axis, is provided.

(5)

The image blur correction device according to any one of (1) to (4), in which the axis of rotation of the first rotor coincides with a central axis of rotation of the second rotor.

(6)

The image blur correction device according to any one of (1) to (5), in which a rigid ball is used as the rolling member.

(7)

The image blur correction device according to (6), in which a guide groove, which extends in a circumferential direction and into which a part of each rigid ball is inserted, is formed on the stator and the first rotor.

(8)

The image blur correction device according to any one of (1) to (5), in which a rotating body is used as the rolling member, in which the rotating body has a connection shaft portion which extends in a direction orthogonal to the axis of rotation, an inner rolling portion which is formed in a discoid shape and of which a central portion is combined with one end of the connection shaft portion in an axial direction thereof, and an outer rolling portion which is formed in a discoid shape and of which a central portion is combined with the other end of the connection shaft portion in the axial direction, in which assuming that an outer diameter of the connection shaft portion is R1, an outer diameter of the inner rolling portion is R2, and an outer diameter of the outer rolling portion is R3, R2 and R3 are greater than R1, in which the inner rolling portion is positioned to be closer to the axis of rotation than the outer rolling portion, in which the connection shaft portion is pressed by either one of the stator and the first rotor, and in which the inner rolling portion and the outer rolling portion are pressed by the other of the stator and the first rotor.

(9)

The image blur correction device according to (8), in which the connection shaft portion is pressed by the first rotor, and in which the inner rolling portion and the outer rolling portion are pressed by the stator.

(10)

The image blur correction device according to (9), in which the outer diameter of the outer rolling portion is greater than the outer diameter of the inner rolling portion.

(11)

The image blur correction device according to (10), in which assuming that a distance from the central axis of rotation of the second rotor to the inner rolling portion in a direction orthogonal to the central axis of rotation of the second rotor is R4, and a distance from the central axis of rotation of the second rotor to the outer rolling portion in the direction orthogonal to the central axis of rotation of the second rotor is R5, $$R5/R4=R3/R2.$$

(12)

An imaging apparatus including an image blur correction device that has a driven object which has at least one optical element, an outer casing which has the driven object disposed therein, and a driving motor which rotates the driven object in an axial rotation direction of a fulcrum axis orthogonal to an optical axis of the optical element, and that corrects image blur by rotating the driven object, in which the driving motor includes a stator that has either one of a magnet and a driving coil mounted thereon, a first rotor that is positioned to face the stator and has the other of the magnet and the driving coil mounted thereon so as to rotate in a state where the first rotor is attracted toward the stator by magnetic force, a plurality of rolling members that rotates in accordance with rotation of the first rotor, which is pressed from an opposite side by the stator and the first rotor, and revolves about an axis of rotation of the first rotor, and a second rotor that holds the plurality of rolling members and rotates with the driven object incorporated therein about the axis of rotation of the first rotor in accordance with revolution of the plurality of rolling members.

It should be understood by those skilled in the art that various modifications, combinations, sub-combinations and alterations may occur depending on design requirements and other factors insofar as they are within the scope of the appended claims or the equivalents thereof.

What is claimed is:

1. An image blur correction device comprising:

a first driving motor that is configured to rotate a driven object, which has at least one optical element in order to correct image blur, in an axial rotation direction of a first fulcrum axis orthogonal to an optical axis of the optical element, wherein the first driving motor includes:

a stator that has either one of a magnet and a driving coil mounted thereon, a first rotor that is configured to be positioned to face the stator and has the other of the magnet and the driving coil mounted thereon, wherein the first rotor is configured to rotate in a state where the first rotor is attracted toward the stator by magnetic force, a plurality of rolling members that are configured to rotate in accordance with rotation of the first rotor, which is configured to be pressed from an opposite side by the stator and the first rotor, and revolve about an axis of rotation of the first rotor, and a second rotor that is configured to hold the plurality of rolling members and rotate with the driven object incorporated therein about the axis of rotation of the first rotor in accordance with revolution of the plurality of rolling members.

2. The image blur correction device according to claim 1, wherein an insertion alignment opening is formed on a central portion of the stator, and wherein at least a part of the second rotor is configured to be disposed in the insertion alignment opening.

3. The image blur correction device according to claim 2, wherein a bearing is configured to be disposed in the insertion alignment opening, and wherein the second rotor is configured to rotate about the stator through the bearing.

4. The image blur correction device according to claim 1, wherein a second fulcrum axis orthogonal to both the optical axis and the first fulcrum axis is formed, wherein the first driving motor, which is configured to rotate the driven object in a first direction as the axial rotation direction of the first fulcrum axis, is provided, and wherein a second driving motor, which is configured to rotate the driven object in a second direction as axial rotation direction of the second fulcrum axis, is provided.

5. The image blur correction device according to claim 1, wherein the axis of rotation of the first rotor coincides with a central axis of rotation of the second rotor.

6. The image blur correction device according to claim 1, wherein a rigid ball is used as the rolling member.

7. The image blur correction device according to claim 6, wherein a guide groove, which is configured to extend in a circumferential direction and into which a part of each rigid ball is configured to be inserted, is formed on the stator and the first rotor.

8. The image blur correction device according to claim 1, wherein a rotating body is used as the rolling member, wherein the rotating body has a connection shaft portion which is configured to extend in a direction orthogonal to the axis of rotation, an inner rolling portion which is formed in a discoid shape and of which a central portion is combined with one end of the connection shaft portion in an axial direction thereof, and an outer rolling portion which is formed in a discoid shape and of which a central portion is combined with the other end of the connection shaft portion in the axial direction, wherein in an event an outer diameter of the connection shaft portion is R1, an outer diameter of the inner rolling portion is R2, and an outer diameter of the outer rolling portion is R3, the R2 and the R3 are greater than the R1, wherein the inner rolling portion is configured to be positioned closer to the axis of rotation than the outer rolling portion, wherein the connection shaft portion is configured to be pressed by either one of the stator and the first rotor, and wherein the inner rolling portion and the outer rolling portion are configured to be pressed by the other of the stator and the first rotor.

9. The image blur correction device according to claim 8, wherein the connection shaft portion is configured to be pressed by the first rotor, and wherein the inner rolling portion and the outer rolling portion are configured to be pressed by the stator.

10. The image blur correction device according to claim 9, wherein the outer diameter of the outer rolling portion is greater than the outer diameter of the inner rolling portion.

11. The image blur correction device according to claim 10, wherein in an event a distance from a central axis of rotation of the second rotor to the inner rolling portion in a direction orthogonal to the central axis of rotation of the second rotor is R4, and a distance from the central axis of rotation of the second rotor to the outer rolling portion in the direction orthogonal to the central axis of rotation of the second rotor is R5, $$R5/R4=R3/R2.$$

12. An imaging apparatus comprising:

an image blur correction device that has a driven object which has at least one optical element, an outer casing which has the driven object configured to be disposed therein, and a driving motor which is configured to rotate the driven object in an axial rotation direction of a fulcrum axis orthogonal to an optical axis of the optical element, and that is configured to correct image blur by rotating the driven object, wherein the driving motor includes:

a stator that has either one of a magnet and a driving coil mounted thereon, a first rotor that is configured to be positioned to face the stator and has the other of the magnet and the driving coil mounted thereon, wherein the first rotor is configured to rotate in a state where the first rotor is attracted toward the stator by magnetic force, a plurality of rolling members that are configured to rotate in accordance with rotation of the first rotor, which is configured to be pressed from an opposite side by the stator and the first rotor, and revolve about an axis of rotation of the first rotor, and a second rotor that is configured to hold the plurality of rolling members and rotate with the driven object incorporated therein about the axis of rotation of the first rotor in accordance with revolution of the plurality of rolling members.

* * * * *